(12) United States Patent
Pineault et al.

(10) Patent No.: US 11,846,593 B2
(45) Date of Patent: Dec. 19, 2023

(54) BALL-MAPPING SYSTEM COMPRISING A SAMPLE STAGE AND A SAMPLE HOLDER FOR RECEIVING BALL-SHAPED SAMPLE, AND METHOD OF OPERATING BALL-MAPPING SYSTEM FOR COLLECTING X-RAY DIFFRACTION DATA AT MEASUREMENT POINTS LOCATED ON BALL-SHAPED SAMPLE

(71) Applicant: PROTO PATENTS LTD., LaSalle (CA)

(72) Inventors: James Pineault, Windsor (CA); Alec Iskra, Windsor (CA); Bogdan Levcovici, Windsor (CA); Michael Brauss, Amherstburg (CA)

(73) Assignee: PROTO PATENTS LTD., LaSalle (CA)

( * ) Notice: Subject to any disclaimer, the term of this patent is extended or adjusted under 35 U.S.C. 154(b) by 0 days.

(21) Appl. No.: 17/275,909

(22) PCT Filed: Sep. 12, 2019

(86) PCT No.: PCT/CA2019/051295
§ 371 (c)(1),
(2) Date: Mar. 12, 2021

(87) PCT Pub. No.: WO2020/051708
PCT Pub. Date: Mar. 19, 2020

(65) Prior Publication Data
US 2022/0034826 A1 Feb. 3, 2022

Related U.S. Application Data

(60) Provisional application No. 62/731,344, filed on Sep. 14, 2018.

(51) Int. Cl.
*G01N 23/20* (2018.01)
*G01N 23/20008* (2018.01)
(Continued)

(52) U.S. Cl.
CPC ....... *G01N 23/20025* (2013.01); *G01N 23/20* (2013.01); *G01N 23/20008* (2013.01);
(Continued)

(58) Field of Classification Search
CPC ............ G01N 23/20; G01N 23/20008; G01N 23/20016; G01N 23/20025;
(Continued)

(56) References Cited

U.S. PATENT DOCUMENTS 3,105,901 A * 10/1963 Ladell .................. G01N 23/207
378/81
3,903,415 A 9/1975 Holzapfel
(Continued)

FOREIGN PATENT DOCUMENTS

EP 2775295 9/2014
JP H08271388 10/1996
(Continued)

OTHER PUBLICATIONS

Extended European search report for EP 19860716.0 dated Apr. 21, 2022 (12 pages).
(Continued)

*Primary Examiner* — Allen C. Ho
(74) *Attorney, Agent, or Firm* — Almanac IP Advisors LLP

(57) ABSTRACT

A ball-mapping system connectable to an X-ray diffraction apparatus, for collecting X-ray diffraction data at measurement points located on a ball-shaped sample is provided. The ball-mapping system includes a sample stage, including a sample-contacting surface and a guide assembly cooper-
(Continued)

ating with the sample-contacting surface for guiding the sample-contacting surface along a first axis and along a second axis unparallel to the first axis. The ball-mapping system includes a sample holder for keeping the ball-shaped sample in contact with the sample stage and a motor assembly in driving engagement with the guide assembly, the motor assembly driving the sample-contacting surface in translational movement along the first axis and the second axis, the translational movement of the sample-contacting surface causing the ball-shaped sample to rotate, on the sample-contacting surface along the first axis and the second axis. A method for mapping the ball-shaped sample is also provided.

21 Claims, 12 Drawing Sheets

(51) Int. Cl.
 *G01N 23/20016* (2018.01)
 *G01N 23/20025* (2018.01)
(52) U.S. Cl.
 CPC . *G01N 23/20016* (2013.01); *G01N 2223/056* (2013.01); *G01N 2223/309* (2013.01); *G01N 2223/607* (2013.01); *G01N 2223/624* (2013.01)

(58) Field of Classification Search
 CPC ..... G01N 2223/056; G01N 2223/0561; G01N 2223/0563; G01N 2223/309; G01N 2223/607; G01N 2223/624; G01N 2223/645
 USPC ............................................ 378/70–81, 208
 See application file for complete search history.

(56) References Cited

U.S. PATENT DOCUMENTS

| | | | | |
|---|---|---|---|---|
| 4,364,122 | A * | 12/1982 | Wölfel | G01N 23/207 378/73 |
| 4,710,259 | A * | 12/1987 | Howe | G01N 23/207 117/902 |
| 6,193,199 | B1 * | 2/2001 | Karam, II | G02B 21/26 248/661 |
| 6,859,520 | B2 * | 2/2005 | He | G01N 23/20016 378/81 |
| 6,882,739 | B2 * | 4/2005 | Kurtz | G01N 23/20 356/336 |
| 6,888,920 | B2 * | 5/2005 | Blank | G01N 23/20016 359/822 |
| 7,848,489 | B1 * | 12/2010 | He | G01N 23/207 378/81 |
| 7,884,326 | B2 * | 2/2011 | van de Water | H01J 37/20 250/311 |
| 8,000,444 | B2 * | 8/2011 | Iwasaki | G01N 23/201 378/81 |
| 10,794,844 | B2 * | 10/2020 | Vukotic | G01N 23/20025 |

FOREIGN PATENT DOCUMENTS

| | | |
|---|---|---|
| JP | H09229908 | 9/1997 |
| JP | 2002257743 | 9/2002 |
| JP | 2013250093 | 12/2013 |
| JP | 6300360 | 3/2018 |
| WO | 2018027321 | 2/2018 |

OTHER PUBLICATIONS

Rivero I. V., et al., "Determination of the accuracy of phase analysis measurements on spherical surfaces through X-ray diffraction," NDT&E International, Elsevier, Amsterdam, NL, vol. 41, No. 6, Sep. 2008 (Sep. 2008), pp. 434-440 (8 pages).

International Search Report for PCT/CA2019/051295 dated Nov. 14, 2019. (3 pages).

Written Opinion for PCT/CA2019/051295 dated Nov. 14, 2019. (5 pages).

* cited by examiner

BALL-MAPPING SYSTEM COMPRISING A SAMPLE STAGE AND A SAMPLE HOLDER FOR RECEIVING BALL-SHAPED SAMPLE, AND METHOD OF OPERATING BALL-MAPPING SYSTEM FOR COLLECTING X-RAY DIFFRACTION DATA AT MEASUREMENT POINTS LOCATED ON BALL-SHAPED SAMPLE

CROSS-REFERENCE TO RELATED APPLICATIONS

This application is the National Stage of International Application No. PCT/CA2019/051295, filed on Sep. 12, 2019, which claims the benefit of priority to U.S. Provisional Patent Application No. 62/731,344, filed on Sep. 14, 2018, both of which are hereby incorporated by reference herein in their entirety for all purposes.

TECHNICAL FIELD

The technical field generally relates to materials characterization using X-ray diffraction, and more particularly relates to a system and method for mapping a ball-shaped sample using an X-ray diffraction apparatus.

BACKGROUND

Metal balls, such as steel balls found in ball bearings for example, are typically cold-formed or in some instances hot formed. Metal balls resulting from these processes sometimes have regions which are referred as "poles". Regions of the metal balls corresponding or located near the poles can have different properties than regions that are, for example, closer to the equator, i.e., regions located elsewhere than at or near the poles. Localized or general material properties affected by in service usage and fatigue damage may be of interest (e.g., localized spelling, fatigue damage, heat damage) or thermo-mechanical effects as a result of LCF (low cycle fatigue), HCF (high cycle fatigue), monotonic loading, and others may be of interest as they may or may not affect the quality of the ball. Such analyses may be employed on coatings and substrates as applicable.

Some of the properties which might be of interest in the case of steel balls include but are not limited to residual stress (RS), strain or crystallographic strain, and percent retained austenite (% RA). When it comes to Fe-base alloys and other materials or metals, such as titanium for example, other properties can be of interest. Indeed, one may be interested into phase mapping the material (e.g., for mapping the alpha and/or beta phases) or characterize the dislocation density and particle size within the material via various methods (e.g., via methods including but not limited to Warren-Averbach, including variations, Williamson-Hall, Voigt, Scherer, empirical methods with or without reference standard, and the like) and/or direct measures of FWHM (full width half maximum), integral breadth of other forms of peak shape/profile analyses may provide useful information. Texture analysis, pole figures and ODF (orientation distribution function), crystal orientation, and others may also be properties of interest for characterization as well as strain pole figures. Other properties such as the lattice parameter (or unstressed lattice spacing) and others may be used to calculate % Carbon and other similar or dissimilar properties i.e., composition related physical, mechanical, electrical, optical, or other performance related properties. Coating thickness and quality may also be determined by a variety of methods and techniques. Characterizing the abovementioned properties may or may not require complex mechanical systems or destructive methods.

Many challenges still exist in the field of ball-mapping systems for locating the poles in a non-destructive manner using an X-ray diffraction apparatus.

SUMMARY

In accordance with one aspect, there is provided a ball-mapping system connectable to an X-ray diffraction apparatus, for collecting X-ray diffraction data at measurement points located on a ball-shaped sample, the ball-mapping system including a sample stage, including: a sample-contacting surface onto which the ball-shaped sample is placeable; and a guide assembly cooperating with the sample-contacting surface for guiding the sample-contacting surface along a first axis and along a second axis unparallel to the first axis, a sample holder for keeping the ball-shaped sample in contact with the sample stage; a motor assembly in driving engagement with the guide assembly, the motor assembly driving the sample-contacting surface in translational movement along the first axis and the second axis, the translational movement of the sample-contacting surface causing the ball-shaped sample to rotate, on the sample-contacting surface along the first axis and the second axis; and a control unit for controlling the motor assembly and directing movement of the sample stage such that X-ray diffraction data is collected at each one of the measurement points.

In some embodiments, the guide assembly includes a first guide cooperating with the sample-contacting surface for guiding the sample-contacting surface along the first axis and a second guide cooperating with the sample-contacting surface for guiding the sample-contacting surface along the second axis.

In some embodiments, the first guide is slidably engaged with the sample stage.

In some embodiments, the second guide is slidably engaged with the first guide.

In some embodiments, the motor assembly is in independent driving engagement with the first guide and the second guide.

In some embodiments, the sample holder includes a sample-receiving cavity sized to receive the ball-shaped sample therein.

In some embodiments, the ball-mapping system further includes an iris diaphragm having a central aperture, the iris diaphragm being provided within the sample-receiving cavity and being adjustable to contract and expand within the sample-receiving cavity to hold the ball-shaped sample.

In some embodiments, the sample-receiving cavity has a substantially cylindrical body.

In some embodiments, the diaphragm is located at a middle portion of the substantially cylindrical body.

In some embodiments, the ball-mapping system further includes a ring extending along and mechanically coupled to an outer periphery of the iris diaphragm; and a lever mechanically coupled to the ring, wherein, upon rotation of the lever, the ring rotates and engages the iris diaphragm to contract or expand, thereby adjusting the central aperture of the iris diaphragm.

In some embodiments, the iris diaphragm is made of a plurality of interlocked metal blades.

In some embodiments, the sample-receiving cavity has a cavity diameter substantially equal to a diameter of the ball-shaped sample to be received therein.

In some embodiments, the ball-mapping system further includes a support frame supporting the sample holder.

In some embodiments, the support frame includes: a horizontal beam having two extremities; and a first vertical beam and a second vertical beam, each being fixed to a respective one of the two extremities of the horizontal beam, wherein the sample holder is provided within the horizontal beam.

In some embodiments, the first vertical beam and the second vertical beam are fixed to the horizontal beam through removable attachments.

In some embodiments, the support frame is made of an integral piece including the horizontal beam, the first vertical beam and the second vertical beam, the integral piece defining an inverted U-shaped structure.

In some embodiments, the ball-mapping system further includes a base, wherein the support frame is engageable with the base.

In some embodiments, the base has a substantially circular outer periphery.

In some embodiments, the first vertical beam and the second vertical are mounted to the base at diametrically opposed locations.

In some embodiments, the support frame is rotatable about the sample holder.

In some embodiments, the ball-mapping system further includes a first mounting bracket and a second mounting bracket, each one of the first mounting bracket and the second mounting bracket being slidably engageable with the circular outer periphery of the base.

In some embodiments, the first mounting bracket and the second mounting bracket are engaged to the base at diametrically opposed locations.

In some embodiments, the first mounting bracket and the second bracket are each mechanically connected to a respective one of two opposed edges of the first guide.

In some embodiments, wherein the sample-contacting surface is a rubber mat.

In some embodiments, the motor assembly includes at least one motor configured to independently drive the sample-contacting surface in translational movement along the first axis and the second axis.

In some embodiments, the ball-mapping system further includes a gearbox mechanically coupled with the at least one motor, the gearbox being configured such that the sample-contacting surface is translated along one of the first axis and the second axis at a time.

In some embodiments, the motor assembly includes at least two independent motors, each one of the two independent motors driving the sample-contacting surface along a corresponding one of the first axis and the second axis.

In some embodiments, the ball-mapping system further includes a rotation motor to engage the support frame in rotational movement about the sample holder.

In some embodiments, the first axis and the second axis are orthogonal.

In some embodiments, the ball-shaped sample is a ball bearing.

In some embodiments, the sample holder is configured to prevent the ball-shaped sample from sliding on the sample stage.

In some embodiments, the motor assembly is configured to independently drive the sample-contacting surface in translational movement along the first axis and the second axis.

In some embodiments, the motor assembly is configured to simultaneously drive the sample-contacting surface in translational movement along the first axis and the second axis.

In accordance with another aspect, there is provided a ball-mapping apparatus for collecting X-ray diffraction data at measurement points located on a ball-shaped sample, the ball-mapping system including a sample stage, including a sample-contacting surface onto which the ball-shaped sample is placeable and a guide assembly cooperating with the sample-contacting surface for guiding the sample-contacting surface along a first axis and along a second axis unparallel to the first axis; a sample holder for keeping the ball-shaped sample in contact with the sample stage; and a motor assembly in driving engagement with the guide assembly, the motor assembly driving the sample-contacting surface in translational movement along the first axis and the second axis, the translational movement of the sample-contacting surface causing the ball-shaped sample to rotate, on the sample-contacting surface along the first axis and the second axis, the ball-mapping apparatus being connectable to an X-ray diffraction apparatus that generates X-ray radiation and to a control unit controlling the motor assembly and directing movement of the sample stage such that X-ray diffraction data is collected at each one of the measurement points.

In accordance with another aspect, there is provided a method for mapping of a ball-shaped sample using X-ray diffraction. The method includes placing the ball-shaped sample on a sample-contacting surface; restricting movement of the ball-shaped sample with respect to the sample-contacting surface; translating the sample-contacting surface along a first axis and a second axis unparallel to the first axis, thereby causing the ball-shaped sample to rotate on the sample-contacting surface along of the first axis and the second axis to align a plurality of measurement points with an X-ray beam originating from an X-ray diffraction apparatus; and operating the X-ray diffraction apparatus to collect X-ray diffraction data at each one of the measurement points.

In some embodiments, translating the sample-contacting surface includes independently translating the sample-contacting surface along the first axis and the second axis unparallel to the first axis to sequentially align said plurality of measurement points with the X-ray beam originating from the X-ray diffraction apparatus.

In some embodiments, translating the sample-contacting surfaces includes simultaneously translating the sample-contacting surface along the first axis and the second axis unparallel to the first axis to align said plurality of measurement points with the X-ray beam originating from the X-ray diffraction apparatus.

In some embodiments, translating the sample-contacting surface includes operating a motor assembly in driving engagement with a guide assembly cooperating with the sample-contacting surface for driving the sample-contacting surface in translational movement along the first axis and the second axis.

In some embodiments, the first axis and second axis are orthogonal.

In some embodiment, the method further includes rotating the sample holder by a predetermined angle to adjust a rotational degree-of-freedom of the sample holder.

In some embodiments, translating the sample-contacting surface includes preventing the ball-shaped sample from sliding when the sample-contacting surface is in movement with respect to the ball-shaped sample.

In some embodiments, operating the X-ray diffraction apparatus includes collecting between about 5 to about 300 measurement points. In some embodiments, operating the X-ray diffraction apparatus includes collecting more than 300 measurement points.

In some embodiments, the method includes generating a model representative of a surface of the ball-shaped sample and distributing virtual measurement points on the model, the virtual measurement points being representative of the measurement points. In some embodiments, the model is a polygon having a center coinciding with a center of the ball-shaped sample. In some embodiments, the model is an icosahedron.

In accordance with one aspect, there is provided a ball-mapping system connectable to a diffraction apparatus, for collecting diffraction data at measurement points located on a ball-shaped sample, the ball-mapping system including a sample stage, including: a sample-contacting surface onto which the ball-shaped sample is placeable; and a guide assembly cooperating with the sample-contacting surface for guiding the sample-contacting surface along a first axis and along a second axis unparallel to the first axis, a sample holder for keeping the ball-shaped sample in contact with the sample stage; a motor assembly in driving engagement with the guide assembly, the motor assembly driving the sample-contacting surface in translational movement along the first axis and the second axis, the translational movement of the sample-contacting surface causing the ball-shaped sample to rotate, on the sample-contacting surface along the first axis and the second axis; and a control unit for controlling the motor assembly and directing movement of the sample stage such that diffraction data is collected at each one of the measurement points.

In some embodiments, the diffraction data are X-ray diffraction data.

In some embodiments, the diffraction data are neutron diffraction data.

In accordance with another aspect, there is provided a ball-mapping system for an X-ray diffraction apparatus, the ball-mapping system including a sample stage positioned below the sample holder, the sample stage including a first guide extending along an x-axis, a second guide extending along a y-axis perpendicular to the x-axis, the second guide being engageable to the first guide and a sample-contacting surface engageable to the second guide, the sample-contacting surface being selectively and independently adjustable in the x-axis and the y-axis; a sample holder for holding the ball-shaped sample and preventing translational movement of the ball-shaped sample with respect to the sample stage; and at least one motor configured to independently adjust the sample-contacting surface along the x-axis and the y-axis by engaging a respective one of the second guide and the sample-contacting surface in a translational movement along a corresponding one of the x-axis and the y-axis, thereby engaging the ball-shaped sample to roll on the sample-contacting surface along said corresponding one of the x-axis and the y-axis.

In some embodiments, at least one of the first guide and the second guide is elongated.

In some embodiments, the sample holder includes a sample-receiving cavity sized and configured for receiving the ball-shaped sample therein.

In some embodiments, the sample-receiving cavity has a substantially cylindrical body extending between a top end portion and a bottom end portion.

In some embodiments, the ball-mapping system further includes an iris diaphragm having a central aperture passing therethrough and defining a central aperture diameter, the iris diaphragm being provided within the sample-receiving cavity and being adjustable to contract or expand within the sample-receiving cavity, thereby allowing to adjust the central aperture diameter.

In some embodiments, the iris diaphragm is located in the bottom end portion of the substantially cylindrical body of the sample-receiving cavity. In some embodiments, the iris diaphragm is located in the top end potion of the substantially cylindrical body of the sample-receiving cavity.

In some embodiments, the substantially cylindrical body of the sample-receiving cavity includes a middle portion located between the top end portion and the bottom end portion, and wherein the iris diaphragm is located at the middle portion.

In some embodiments, the ball-mapping system further includes a ring extending along and mechanically coupled to an outer periphery of the iris diaphragm; and a lever mechanically coupled to the ring, wherein, upon rotation of the lever, the ring rotates and engages the iris diaphragm to contract or expand, thereby adjusting the central aperture of the iris diaphragm.

In some embodiments, the iris diaphragm is made of a plurality of interlocked metal blades.

In some embodiments, the sample-receiving cavity has a cavity diameter substantially equal to a diameter of the ball-shaped sample to be received therein.

In some embodiments, the sample-receiving cavity has a cavity diameter greater than a diameter of the ball-shaped sample to be received therein.

In some embodiments, the ball-mapping system further includes a support frame for supporting the sample holder.

In some embodiments, the support frame includes: a horizontal beam having two extremities; and a first vertical beam and a second vertical beam, each being fixed to a respective one of the two extremities of the horizontal beam, wherein the sample holder is provided within the horizontal beam.

In some embodiments, the first vertical beam and the second vertical beam are fixed to the horizontal beam through attachments.

In some embodiments, the support frame is made of an integral piece including the horizontal beam, the first vertical beam and the second vertical beam, the integral piece defining an inverted U-shaped structure.

In some embodiments, the ball-mapping system further includes a base, wherein the support frame is engageable with the base.

the base has a substantially circular outer periphery.

In some embodiments, the first vertical beam and the second vertical are mounted to the base at diametrically positions.

In some embodiments, the support frame is configured to be rotatable about the sample holder.

In some embodiments, the ball-mapping system further includes a first mounting bracket and a second mounting bracket, each one of the first mounting bracket and the second mounting bracket being slidably engageable with the circular outer periphery of the base.

In some embodiments, the first mounting bracket and the second mounting bracket are engaged to the base at diametrically opposed locations.

In some embodiments, the first mounting bracket and the second bracket are each mechanically connected to a respective one of two opposed edges of the first guide.

In some embodiments, the sample-contacting surface is adjustable in one direction at a time.

In some embodiments, the sample-contacting surface is made of a material having a substantially high coefficient of friction, thereby allowing the sample to roll rather than slide on the sample-contacting surface.

In some embodiments, the sample-contacting surface is a rubber mat.

In some embodiments, the rubber mat is substantially circular.

In some embodiments, the second guide is slidably engageable with the first guide.

In some embodiments, the ball-mapping system further includes first guide grooves provided in two opposite sides of the first guide; a first connector to slidably engage the second guide with the first guide, the first connector including a first pair of rails, the first pair of rails being complementary and slidably engageable with the first guide grooves; and a first connector channel sized and configured to receive the second guide therein.

In some embodiments, the second guide is mechanically fastened to the first connector in the first connector channel, such that when the first connector slides with respect to the first guide along the x-axis, the first connector engages the second guide to slide with respect to the first guide along the x-axis.

In some embodiments, the sample-contacting surface is slidably engageable with the second guide.

In some embodiments, the ball-mapping system further includes second guide grooves provided in two opposite sides of the second guide; a second connector to slidably engage the sample-contacting surface with the second guide, the second connector including a second pair of rails, the first pair of rails being complementary and slidably engageable with the second guide grooves; and a platform mounted to the second connector, the platform being configured to mechanically connect the sample-contacting surface with the second connector.

In some embodiments, the sample-contacting surface is mechanically fastened to the second connector, such that when the second connector slides with respect to the second guide along the y-axis, the second connector engages the sample-contacting surface to slide with respect to the second guide along the y-axis.

In some embodiments, the least one motor is one motor configured to independently translate the sample-contacting surface along the x-axis and y-axis.

In some embodiments, the ball-mapping system further includes a gearbox mechanically coupled with the motor, the gearbox being configured such that the sample-contacting surface is translated along only one of the x-axis and the y-axis at a time.

In some embodiments, the at least one motor is two independent motors, each one of the two independent motors being configured to translate the sample-contacting surface along a respective one of the x-axis and the y-axis.

In some embodiments, the at least one motor is three independent motors, two of the three independent motors being configured to translate the sample-contacting surface along a respective one of the x-axis and the y-axis, and a third one of the three independent motors being configured to engage the support frame in rotation.

In accordance with another aspect, there is provided a ball-mapping system for an X-ray diffraction apparatus, the ball-mapping system including a sample holder for holding a sample; a sample stage positioned below the sample holder and having two translational degrees-of-freedom; and at least one motor to engage the sample stage in a translation movement along the two translational degrees-of-freedom, said at least one motor being configured such that: when the sample stage is translated along a first one of the two translational degrees-of-freedom, the sample stage remains lock along a second one of the two translational degrees-of-freedom; and when the sample stage is translated along the second one of the two translational degrees-of-freedom, the sample stage remains lock along the first one of the two translational degrees-of-freedom.

In some embodiments, the two translational degrees-of-freedom are mutually perpendicular.

In some embodiments, the sample holder includes a sample-receiving cavity sized and configured for receiving a ball-shaped sample therein.

In some embodiments, the sample-receiving cavity has a substantially cylindrical body extending between a top end portion and a bottom end portion.

In some embodiments, further includes an iris diaphragm having a central aperture passing therethrough and defining a central aperture diameter, the iris diaphragm being provided within the sample-receiving cavity and being adjustable to contract or expand within the sample-receiving cavity, thereby allowing to adjust the central aperture diameter.

In some embodiments, the iris diaphragm is located in the bottom end portion of the substantially cylindrical body of the sample-receiving cavity. In some embodiments, the iris diaphragm is located in the top end portion of the substantially cylindrical body.

In some embodiments, the substantially cylindrical body of the sample-receiving cavity includes a middle portion located between the top end portion and the bottom end portion, and wherein the iris diaphragm is located at the middle portion.

In some embodiments, the ball-mapping system further includes a ring extending along and mechanically coupled to an outer periphery of the iris diaphragm; and a lever mechanically coupled to the ring, wherein, upon rotation of the lever, the ring rotates and engages the iris diaphragm to contract or expand, thereby adjusting the central aperture of the iris diaphragm.

In some embodiments, the iris diaphragm is made of a plurality of interlocked metal blades.

In some embodiments, the sample-receiving cavity has a cavity diameter substantially equal to a diameter of the ball-shaped sample to be received therein.

In some embodiments, the sample-receiving cavity has a cavity diameter greater than a diameter of the ball-shaped sample to be received therein.

In some embodiments, the ball-mapping system, further includes a support frame for supporting the sample holder.

In some embodiments, the support frame includes: a horizontal beam having two extremities; and a first vertical beam and a second vertical beam, each being fixed to a respective one of the two extremities of the horizontal beam, wherein the sample holder is provided within the horizontal beam.

In some embodiments, the first vertical beam and the second vertical beam are fixed to the horizontal beam through attachments.

In some embodiments, the support frame is made of an integral piece including the horizontal beam, the first vertical beam and the second vertical beam, the integral piece defining an inverted U-shaped structure.

In some embodiments, the ball-mapping system further includes a base, wherein the support frame is engageable with the base.

In some embodiments, the base has a substantially circular outer periphery.

In some embodiments, the first vertical beam and the second vertical are mounted to the base at diametrically positions.

In some embodiments, the support frame has a rotational degree-of-freedom and is configured to be rotatable about the sample holder.

In some embodiments, the ball-mapping system further includes a first guide extending along an x-axis parallel to one of the two translational degrees-of-freedom; a second guide extending along a y-axis parallel to another one of the two translational degrees-of-freedom, the second guide being engageable to the first guide; and a sample-contacting surface engageable to the second guide, In some embodiments, the ball-mapping system further includes a first mounting bracket and a second mounting bracket, each one of the first mounting bracket and the second mounting bracket being slidably engageable with the circular outer periphery of the base.

In some embodiments, the first mounting bracket and the second mounting bracket are engaged to the base at diametrically-opposed locations.

In some embodiments, the first mounting bracket and the second bracket are each mechanically connected to a respective one of two opposed edges of the first guide.

In some embodiments, the first guide and the second guide have an elongated shape.

In some embodiments, the sample-contacting surface is made of a material having a substantially high coefficient of friction, thereby allowing the sample to roll rather than slide on the sample-contacting surface.

In some embodiments, the sample-contacting surface is a rubber mat.

In some embodiments, the rubber mat is substantially circular.

In some embodiments, the second guide is slidably engageable with the first guide.

In some embodiments, the ball-mapping system further includes first guide grooves provided in two opposite sides of the first guide; a first connector to slidably engage the second guide with the first guide, the first connector including a first pair of rails, the first pair of rails being complementary and slidably engageable with the first guide grooves and a first connector channel sized and configured to receive the second guide therein.

In some embodiments, the second guide is mechanically fastened to the first connector in the first connector channel, such that when the first connector slides with respect to the first guide along the first one of the two translational degrees-of-freedom, the first connector engages the second guide to slide with respect to the first guide along the first one of the two translational degrees-of-freedom.

In some embodiments, the sample-contacting surface is slidably engageable with the second guide.

In some embodiments, the ball-mapping system further includes second guide grooves provided in two opposite sides of the second guide; a second connector to slidably engage the sample-contacting surface with the second guide, the second connector including a second pair of rails, the first pair of rails being complementary and slidably engageable with the second guide grooves; and a platform mounted to the second connector, the platform being configured to mechanically connect the sample-contacting surface with the second connector.

In some embodiments, the sample-contacting surface is mechanically fastened to the second connector, such that when the second connector slides with respect to the second guide along the second one of the two translational degrees-of-freedom, the second connector engages the sample-contacting surface to slide with respect to the second guide along the second one of the two translational degrees-of-freedom.

In some embodiments, the at least one motor is one motor configured, the ball-mapping system further including a gearbox mechanically coupled with the motor, the gearbox being configured such that the sample-contacting surface is translated along only one of the two translational degrees-of-freedom at a time.

In some embodiments, the at least one motor is two independent motors, each one of the two independent motors being configured to translate the sample-contacting surface along a respective one of the two translational degrees-of-freedom.

In some embodiments, the at least one motor is three independent motors, two of the three independent motors being configured to translate the sample-contacting surface along the two translational degrees-of-freedom, and a third one of the three independent motors being configured to engage the support frame in rotation.

In accordance with another aspect, there is provided a method for mapping a ball-shaped sample with an X-ray diffraction apparatus, the method including steps of: mounting the ball-shaped sample in a sample holder; contacting a portion of the ball-shaped sample with a sample-contacting surface of a sample stage; adjusting the sample stage along two mutually perpendicular axes, including selectively engaging the sample stage in a sequential translation movement along the two mutually perpendicular axes; and engaging the sample to roll on the sample-contacting surface along a respective one of the two mutually perpendicular axes at a time towards a characterization position; characterizing the ball-shaped sample with the X-ray diffraction apparatus while the sample is in the characterization position; and moving the ball-shaped sample to another characterization position.

In some embodiments, the step of adjusting the sample stage along two mutually perpendicular axes includes adjusting the sample stage along an x-axis; and independently adjusting the sample stage along a y-axis.

In some embodiments, the sample holder has a rotational degree-of-freedom, the method further including a step of adjusting the rotational degree-of-freedom of the sample holder with respect to the sample stage.

In some embodiments, adjusting the rotational degree-of-freedom includes rotating the sample holder by a predetermined angle.

In some embodiments, the method further includes engaging the sample to roll on the sample-contacting surface along a corresponding one of the two mutually perpendicular axes.

In some embodiments, the step of characterizing the ball-shaped sample includes predetermining locations of measurements on the ball-shaped sample by distributing measurement points on the ball-shaped sample.

In some embodiments, distributing the measurement points on the ball-shaped sample includes positioning said plurality of measurement points at predetermined latitudes of the ball-shaped sample, each one of the predetermined latitudes including a preselected number of measurement points.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction and in a y-axis direction; and independently changing a position of the sample stage along the x-axis direction and along the y-axis direction.

In some embodiments, the preselected latitudes each includes the same number of preselected number of measurement points.

In some embodiments, the number of measurement points ranges from about 6 to about 300. In some embodiments, the number of measurement points is equal or greater than 300.

In some embodiments, distributing the measurement points on the ball-shaped sample includes generating a polygonal model having a center coinciding with a center of the sample; and positioning said plurality of measurement points on the vertices of the polygonal model.

In some embodiments, the polygonal model is an icosahedron.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction and in a y-axis direction; and independently changing a position of the sample stage along the x-axis direction and along the y-axis direction.

In some embodiments, the number of measurement points ranges from about 10 to about 370.

In accordance with another aspect, there is provided a method for mapping a ball-shaped sample with an X-ray diffraction apparatus, the method including steps of mounting the ball-shaped sample in a sample holder; contacting a portion of the ball-shaped sample with a sample-contacting surface of a sample stage; adjusting the sample stage along two translational degrees-of-freedom, including selectively engaging the sample stage in a sequential translation movement along the two translational degrees-of freedom towards a characterization position, such that when translating the sample stage along a first one of the two translational degrees-of-freedom, locking a second one of the two translational degrees-of-freedom; and when translating the sample stage along the second one of the two translational degrees-of-freedom, locking the first one of the two translational degrees-of-freedom; characterizing the ball-shaped sample with the X-ray diffraction apparatus while the sample is in the characterization position; and moving the ball-shaped sample to another characterization position.

In some embodiments, the first degree of freedom and the second degree of freedom are mutually perpendicular.

In some embodiments, the step of adjusting the sample stage along two translational degrees-of-freedom includes adjusting the first one of the two translational degrees-of-freedom and subsequently adjusting the second one of the two translational degrees-of-freedom.

In some embodiments, the sample holder has a rotational degree-of-freedom, the method further including a step of adjusting the rotational degree-of-freedom of the sample holder with respect to the sample stage.

In some embodiments, adjusting the rotational degree-of-freedom includes rotating the sample holder by a predetermined angle.

In some embodiments, the method further includes engaging the sample to roll on the sample-contacting surface along a corresponding one of the two translational degrees-of-freedom.

In some embodiments, the step of characterizing the ball-shaped sample includes predetermining locations of measurements on the ball-shaped sample by distributing measurement points on the ball-shaped sample.

In some embodiments, distributing the measurement points on the ball-shaped sample includes positioning said plurality of measurement points at predetermined latitudes of the ball-shaped sample, each one of the predetermined latitudes including a preselected number of measurement points.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction extending parallel to the first one of the two translational degrees-of-freedom and in a y-axis direction extending parallel to the first one of the two translational degrees-of-freedom; and independently changing a position of the sample stage along the x-axis direction and along the y-axis direction.

In some embodiments, the preselected latitudes each includes the same number of preselected number of measurement points.

In some embodiments, the number of measurement points ranges from about 6 to about 300.

In some embodiments, distributing the measurement points on the ball-shaped sample includes generating a polygonal model having a center coinciding with a center of the sample; and positioning said plurality of measurement points on the vertices of the polygonal model.

In some embodiments, the polygonal model is an icosahedron.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction extending parallel to the first one of the two translational degrees-of-freedom and in a y-axis direction extending parallel to the second one of the two translational degrees-of-freedom; and independently changing a position of the sample stage along the x-axis direction and along the y-axis direction.

In some embodiments, the number of measurement points ranges from about 10 to about 370.

Other features will be better understood upon reading of embodiments thereof with reference to the appended drawings.

DETAILED DESCRIPTION

Figure 1:
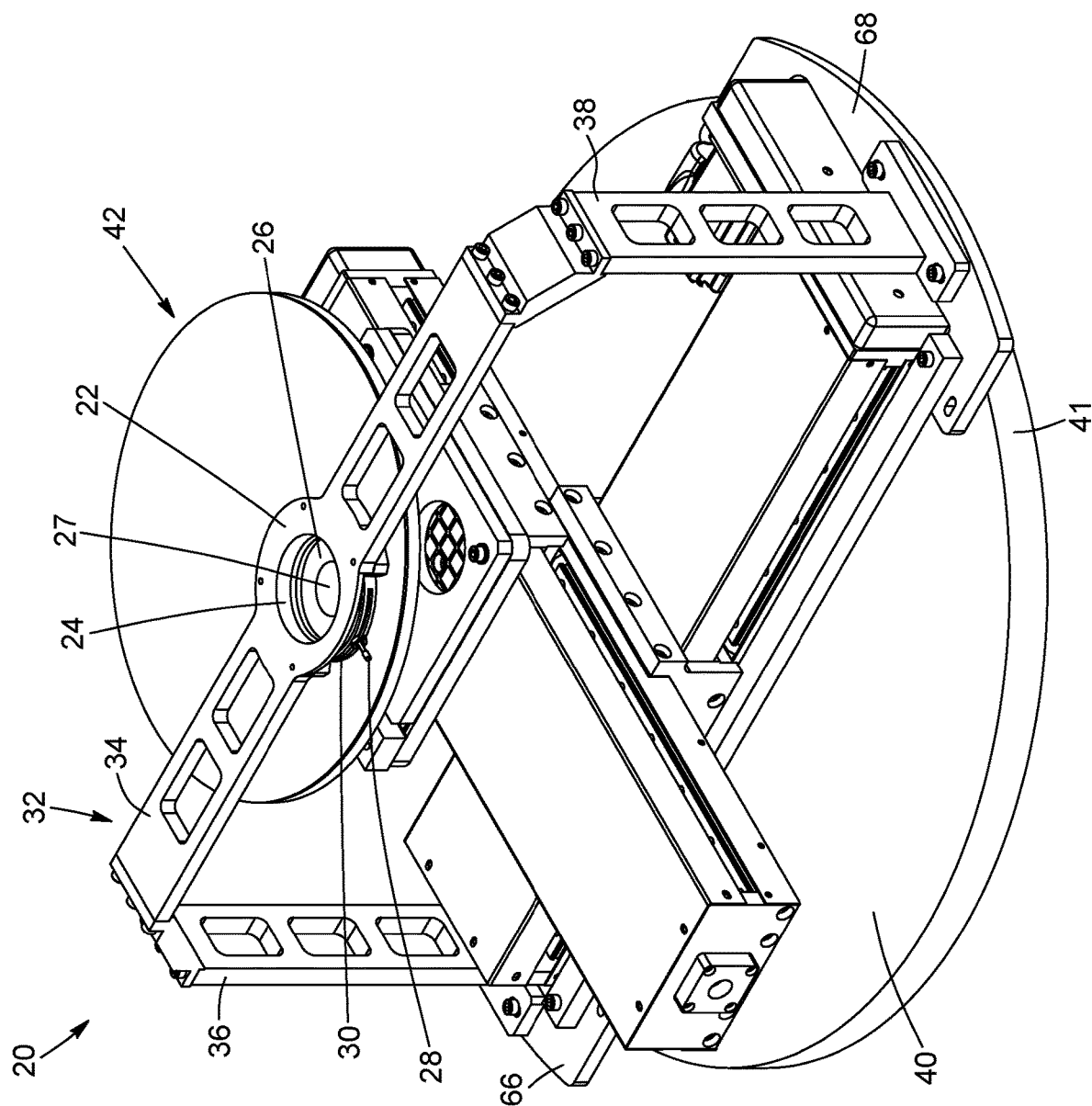
FIG. 1 is a top perspective view of a ball-mapping system, in accordance with one embodiment.

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

It will be appreciated that positional descriptions such as "top", "bottom", "above", "under", "below", "left", "right", "front", "rear", "parallel", "perpendicular", "transverse", "inner", "outer", "internal", "external", and the like should, unless otherwise indicated, be taken in the context of the figures and should not be considered limiting.

The terms "X-ray", "X-radiation", "light", "electromagnetic radiation", "optical", "spectral profile" "spectral waveband", derivatives and variants thereof, are used to refer to radiation in any appropriate region of the electromagnetic spectrum and, more particularly, are not limited to visible light. By way of example, the X-rays may cover or substantially correspond to wavelengths ranging from 0.01 to 10 nanometers (i.e., frequencies in the range of 30 petahertz to 30 exahertz), which may be of particular interest for applications in the materials science industry for investigating the structural and/or mechanical properties of samples. Such properties include but are not limited to atomic structure, phase mapping, dislocation, residual stress and percent retained austenite (sometimes referred to as "% RA").

The terms "sample", "sample under investigation", "material", "analyzed sample", "powder", "thin films", derivatives and variants thereof are used to refer to a quantity of matter extracted or taken apart from a larger amount for analysis, or may refer to matter that is either natural (e.g., a specific chemical element found in nature), synthesized (e.g., a reaction of chemical compounds), or man-made (e.g., a power formed by scratching a thin film). It will be understood that the sample intrinsically has various physical and chemical properties, which may be assessed using different instruments and methods (e.g., XRD analysis). In the context of the current disclosure, it is to be noted that the samples to be characterized are typically substantially spherical, and so will sometimes be referred to as "spherical samples", "ball-shaped samples" or simply "balls". More generally, the samples can have a round, roundish, globular or ovoid body. In some scenarios, the samples can be a portion of sphere (e.g., a hemisphere).

The terms "diffractometer", "X-ray diffraction apparatus", "XRD diffraction system", "powder diffraction instruments", "X-ray apparatus", derivatives and variants thereof refer to an apparatus configured to acquire patterns obtained by recording the intensities of X-rays scattered by the sample under investigation at different angles between an incident beam (i.e., beam incident on the sample) and a scattered beam (also referred to as "reflected beam"). The acquired patterns are typically representative of given properties (e.g., structure) of the material to be inspected. The above-mentioned apparatus could further be understood as a device configured to sense and/or probe x-rays scattered and/or reflected by the surface to be inspected, according to the needs of a particular application.

The XRD apparatus may include an X-ray source (including, for example, a vacuum-sealed X-ray tube or incorporate into a high flux source such as a synchrotron, liquid metal jet, or any other, or any neutron source), an X-ray generator delivering high tension current to the X-ray source, a sample holder to hold the sample to be investigated, an X-ray detector capable of detecting X-ray and/or X-ray photons scattered by the sample and an X-ray optical assembly (typically used for collimating, conditioning, or focusing the X-rays at the detector). The XRD pattern is obtained by recording the intensities of X-rays scattered by the sample at different angles between the beam incident on the sample and beam scattered by the sample.

In the following description, the "XY plane" is defined as a plane substantially parallel to (or a plane coinciding with) a surface, a portion or a section of the sample to be characterized. In such scenario, a "Z direction" or, alternatively, a "Z axis", and variants thereof (e.g., "Z plane") will hence be understood as the axis being substantially perpendicular to the XY plane (i.e., the surface of the sample). Broadly, the present description will refer to the "X, Y, Z planes" as being three perpendicularly intersecting planes. For the sake of clarity and concision of the present description, the XY plane will herein be referred to as lying in a horizontal plane (i.e., a horizontal direction), while the Z axis will be referred to as lying in a vertical plane (i.e., a vertical direction).

Ball-Mapping System

The present description generally relates to a ball-mapping system for an X-ray diffraction apparatus.

Some embodiments may be useful in the field of X-ray diffraction when, for example, the atomic and/or molecular structure of a crystal has to be identified, or when residual stress of materials has to be assessed. Embodiments of the ball-mapping system and associated XRD apparatus are described below as they have been designed for use in the field of material inspection, but they may of course be used in the broad field of non-destructive inspection, testing or evaluation, in which XRD analysis only serves the purpose of a useful example.

In some embodiments, the ball-mapping system can be used with an XRD apparatus for locating poles in a ball-shaped sample. Knowledge of poles location may be useful when one is interested in testing sample at, near or away from the poles. After localization of the poles, different properties can be investigated, such as, for example and without being limitative, the consistency of peening, tumbling, and/or grinding. The combination of the ball-mapping system and the XRD apparatus, as it will be explained in greater detail below can also be used to provide RS mapping and constituent(s) phase mapping (for example and without being limitative: martensite, austenite, carbides, metal oxides (ceramics), etc.) can also be carried out. Moreover, dislocation density maps can also be collected (e.g., full width at half maximum ("FWHM") and/or integral breadth ("IB")). While the ball-mapping system and related elements and/or components that will be described herein are particularly useful in the field of materials analysis and may be particularly useful for allowing high-precision positioning of a ball-shaped sample, they may also be aimed at other applications, such as different kinds of microscope or other optical assembly or system in which positioning of a sample at a precise location may be needed. More generally, the ball-mapping system can also be compatible with other non-destructive methods (which may include physical testing), such as but not limited to hardness, eddy current, neutron-matter scattering and/or ultrasonic measurements.

In some embodiments, the ball-mapping system could be used with a neutron diffraction apparatus, or with any other type of apparatus for measuring diffraction-based data.

It will be readily understood that the ball mapping as it will be described below can also be performed on a variety of materials, including but not limited to steel, titanium and carbides. It is to be noted that specific properties of each materials can be mapped.

Broadly described, the present description relates to a ball-mapping system for an X-ray diffraction apparatus including a sample holder, a sample stage and a motor assembly including at least one motor (simply referred to as the "motor"). The sample holder is configured to hold a sample. In some embodiments, the sample stage is positioned below the sample holder and has a sample-contacting surface. The sample stage is adjustable along two unparallel axes, that are preferably orthogonal axes. The motor assembly is configured to engage the sample stage in a translation movement along the two axes, thereby causing the sample to roll on the sample-contacting surface along the two axes, thereby allowing adjusting the sample stage in the two directions defined by the axes.

Turning to the figures, different embodiments of the ball-mapping system will now be described.

Figure 2:
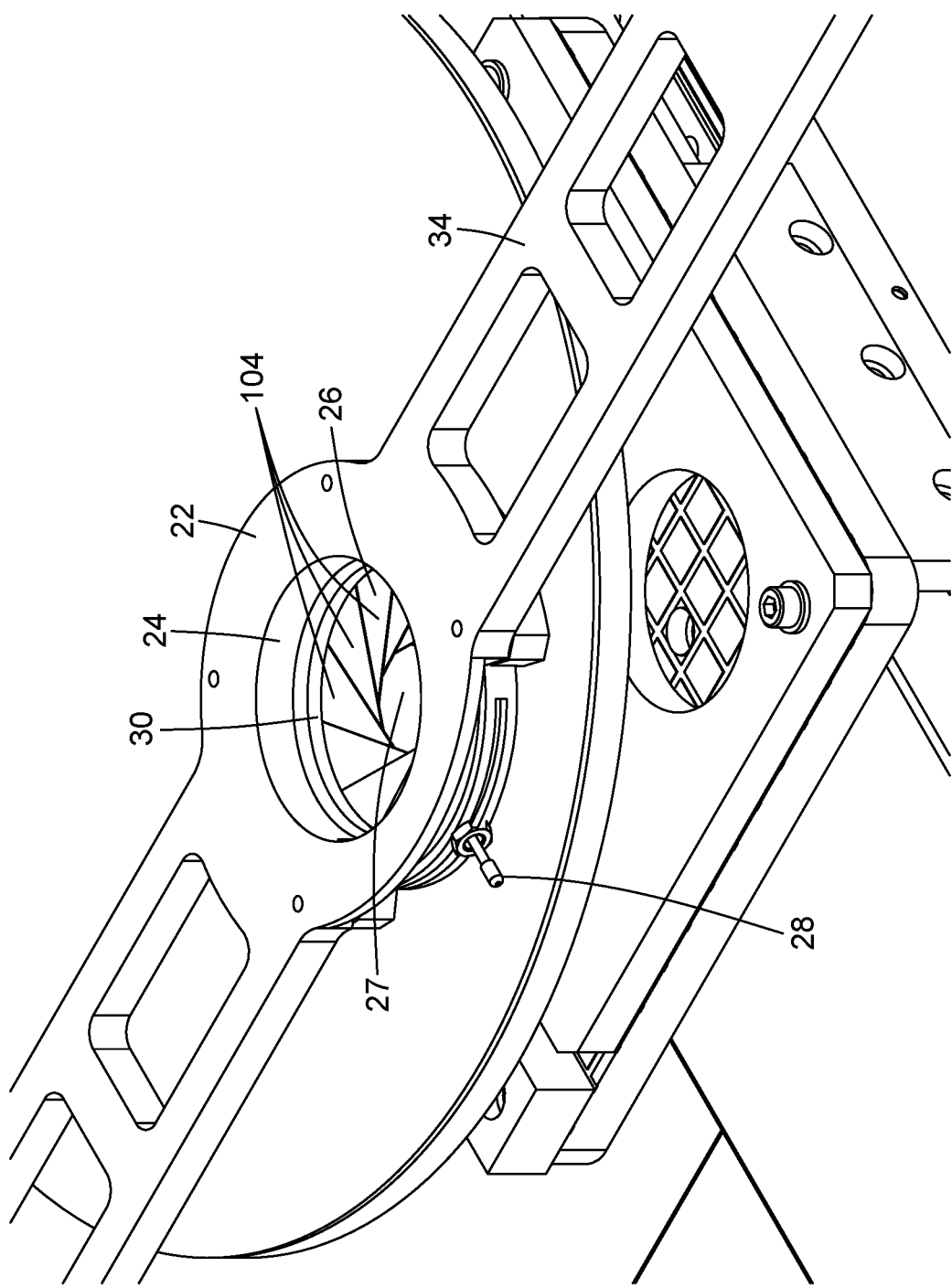
FIG. 2 is a partial top perspective view of the ball-mapping system of FIG. 1.

Referring to FIGS. 1 and 2, a ball-mapping system 20 is shown. The ball-mapping system 20 includes a sample holder 22, which will now be described in greater detail.

Sample Holder

The sample holder 22 is configured to hold a sample (not shown in FIGS. 1 and 2, but illustrated, for example as a ball-shaped sample, in FIGS. 3 and 4) in place during measurements. The sample holder 22 includes a sample-receiving cavity 24 for receiving the sample therein. The sample-receiving cavity 24 is depicted as having a substantially circular cross-section and as such defines a substantially cylindrical sample-receiving cavity 24, i.e., the sample-receiving cavity 24 has a substantially cylindrical body. As illustrated, the substantially cylindrical body extends between a top end portion and a bottom end portion. This configuration of the sample-receiving cavity 24 allows the sample holder 22 to receive and hold a substantially spherical (i.e., a ball-shaped) sample in place. Of course, the shape of the sample-receiving cavity 24 can differ from the substantially circular cross-section illustrated in the Figures, as long as the sample-receiving cavity 24 is shaped and configured to receive the ball-shaped sample therein and allows its relative movement with other components of the ball-mapping system 20 that will be later described.

In some embodiments wherein the sample-receiving cavity 24 has a substantially cylindrical body, a diameter (i.e., a dimension taken along a cross-section of the sample-receiving cavity 24), of the sample-receiving cavity 24 can be substantially equal to a diameter of the sample to be characterized, or slightly smaller such that the sample tightly fits in the sample-receiving cavity 24. Alternatively, the diameter of the sample-receiving cavity 24 can either be greater or smaller than the diameter of the sample. It has to be noted that the geometrical configuration, including the shape and dimensions of the sample-receiving cavity 24, are designed and configured in a way that the sample can be held in the sample-receiving cavity 24. As such, in the alternatives in which the diameter of the sample-receiving cavity 24 is greater than the diameter of the sample, a mechanism or appropriate component(s) can be provided to hold the sample in place in the sample-receiving cavity 24.

In the non-limitative illustrated embodiments, the sample-receiving cavity 24 is provided with an iris diaphragm 26. In some embodiments, the iris diaphragm 26 is located at the bottom end portion of the sample-receiving cavity 24 or, in other embodiments, close to the bottom end portion of the sample-receiving cavity 24. Alternatively, the iris diaphragm 26 could be provided in the middle portion of the sample-receiving cavity 24, i.e., between the top end and bottom end portions defining the extremities of the sample-receiving cavity 24, or in the top portion of the sample-receiving cavity 24. In other embodiments, the iris diaphragm 26 can be provided anywhere between the top portion and the middle portion or anywhere between the middle portion and the bottom portion. In some embodiments, the iris diaphragm 26 can be omitted, and the sample-receiving cavity 24 can be, for example and without being limitative, continuously tapered from the top end portion towards the bottom end portion. In this example, the bottom end portion and the top end portion each has a respective inner diameter, and the inner diameter of the bottom end portion is smaller than the inner diameter of the top end portion. Such a continuously tapered sample-receiving cavity 24 can accommodate ball-shaped samples having various dimensions.

The iris diaphragm 26 is adjustable to contract or expand within the sample-receiving cavity 24, thereby allowing to control a diameter of its central aperture 27, which in turn results in adjusting a diameter of a section of the sample-receiving cavity 24. The expression "contract" herein refers to a configuration in which the diameter of the section of the sample-receiving cavity 24 is reduced, whereas the expression "expand" herein refers to a configuration in which the diameter of the section of the sample-receiving cavity 24 is increased. The control of the diameter of the central aperture 27 of the iris diaphragm 26 allows providing support for or applying pressure to ball-shaped samples having various dimensions.

In the embodiment shown, the iris diaphragm 26, and more particularly the diameter of its central aperture 27, can be adjusted by a lever 28 associated to a ring 30. The ring 30 extends along an outer periphery of the iris diaphragm 26 (i.e., the ring 30 surrounds the iris diaphragm 26), such that, upon a rotation of the lever 28, either by a user or mechanical action (e.g., a motor), the iris diaphragm 26 contracts or expands, thereby changing the diameter of its central aperture 27. Of course, one would readily understand that the lever 28 could be any other component(s) or mechanism cooperating with the iris diaphragm 26 to adjust the central aperture 27, and so that the lever 28 only serves the purpose of a nonlimitative embodiment.

When the sample is mounted into the sample holder 22, the iris diaphragm 26 is configured to support the sample within the sample-receiving cavity 24 and to allow a portion of the sample to protrude below the sample holder 22. As a result, a portion of the sample can extend below the iris diaphragm 26 (and so below the sample holder 22). In the illustrated embodiment, a bottom portion of the ball-shaped sample projects downwardly from the iris diaphragm 26, with respect to the z-axis, when the ball-shaped sample is mounted in the sample-receiving cavity 24.

Depending of the relative height of the iris diaphragm 26 within the sample-receiving cavity 24 (i.e. the positioning of the iris diaphragm 26 within the sample-receiving cavity 24), the sample can be mounted at different height (i.e., a direction parallel to the z-axis) therein. In some embodiments, the iris diaphragm 26 is close enough to the bottom portion of the sample-receiving cavity 24 to allow a spherical segment (i.e., a spherical cap or dome) to hang from the iris diaphragm 26 below the lower portion of the sample-receiving cavity 24. In some embodiments, the iris diaphragm 26 is provided in the top portion of the sample-receiving cavity 24 and is configured to provide support or apply pressure to the sample.

Adjustment of the sample at a proper height within the sample-receiving cavity 24 can be carried by different means and methods which are globally referred to "calibration" or "adjustment" of the sample within the sample holder 22. Such calibration or adjustment includes but are not limited to varying the diameter of the central aperture 27 of the iris diaphragm 26.

Once the calibration or adjustment is made, the iris diaphragm 26 can contact the sample at different places. In some embodiments, the iris diaphragm 26 contacts the sample near its equator, i.e., a latitude located halfway between two opposite extremities of the sample. In other embodiments, the iris diaphragm 26 could contact the sample either under or above its equator. In some embodiments, the iris diaphragm 26 can be in direct contact with an entirety of the periphery of the sample. As it has been previously mentioned, the iris diaphragm 26 is generally configured for providing support or applying support to the sample. In other embodiments, the iris diaphragm 26 can be in direct contact with only portion(s) of the periphery of the sample, such as, for example and without being limitative, spaced-apart points distributed along the periphery of the sample. In such embodiments, the spaced-apart point could either being separated by a constant distance or a non-constant distance.

It is to be noted that the latitude at which the sample intersects or is supported by the iris diaphragm 26 can be a function of the size of the central aperture 27 and/or the sample and its specific geometrical configuration.

In some embodiments, the iris diaphragm 26 is made of a thin metal plate, and more particularly a plurality of interlocking metal blades 104. Alternatively, the iris diaphragm 26 could be made of plastic, polymer, or any other materials suitable for supporting the sample within the sample-receiving cavity 24.

While the ball-shaped sample is illustrated as being held in place by the iris diaphragm 26, the sample could also be held, in alternate embodiments, by different mechanism, means or components. For example, and without being limitative, the sample can be held in place with adjustable pins or conical-shaped piece for receiving the sample therein.

Still referring to FIGS. 1 and 2, the ball-mapping system 20 also includes a support frame 32 for supporting the sample holder 22.

In the illustrated embodiment, the support frame 32 includes a horizontal beam 34 fixed, at its extremities, to a first vertical beam 36 and a second vertical beam 38. Once assembled, the horizontal beam 34, the first vertical beam 36 and the second vertical beam 38 defined an inverted U-shaped structure. Of course, the shape of the support frame 32 could vary depending on various factors, including, for example and without being limitative, the type of samples under investigation, as well as their geometrical configuration.

The horizontal beam 34, as well as the first and second vertical beams 36, 38 can be made of the same material. For example, and without being limitative, the beams 34, 36, 38 may be made from any solid material such as polymers (such as and without being limitative vinyl, fiberglass, rigid polyvinyl chloride (PVC)), metals including metal alloys (such as and without being limitative aluminum and aluminium alloys), stainless steel, brass, copper, combinations thereof, or any other material that can be configured to form the horizontal beam 34 or the vertical beams 36, 38. Of course, the beams 34, 36, 38 could have various geometrical configurations (i.e., size and dimensions). As depicted, they each have a substantially rectangular shape and comprise rectangular holes. Of course, they could, for example, have a triangular, rectangular, circular, or any other shaped holes.

In some embodiments, the first and second vertical beams 36, 38 are fixed to the horizontal beam 34 through attachments joining the first and second vertical beams 36, 38 to the horizontal beam 34 at each one of its extremities. In alternate embodiments, the support frame 32 could be made from an integral piece defined a structure of similar shape than the one described above.

In some embodiments, the ball-mapping system 20 also includes a base 40. In the illustrated embodiments, the base 40 has a substantially circular outer periphery 41, i.e., the base 40 has a circular or a disk-shaped body. In alternate embodiments, the general shape of the base 40 could vary. When the ball-mapping system 20 is not provided with the base 40, the support frame 32, and more particularly the first and second vertical beams 36, 38, can be fixed to the table onto which is mounted the ball-mapping system 20. With reference to FIGS. 6 to 9, the base 40 can be mechanically connected to a supporting element 70. In some embodiments, the supporting element 70 is mounted or connected to the XRD apparatus. The cooperation between the base 40 and the supporting element 70 can be such that the base 40 can be driven in a relative rotational movement with respect to the supporting element 70. Such a relative rotational movement can be useful to adjust the position of the base 40, and so the sample with respect to the XRD apparatus, e.g., the X-rays source and/or the detector (not illustrated in FIGS. 6 to 9).

The base 40 can be made from a broad variety of material, including but not limited to polymers (such as and without being limitative vinyl, fiberglass, rigid polyvinyl chloride (PVC)), metals including metal alloys (such as and without being limitative aluminum and aluminium alloys), stainless steel, brass, copper, combinations thereof, or any other material that can be configured to form the base 40. The material(s) forming the base 40 could either be the same or different than the material(s) forming the support frame 32 or portion(s) thereof.

The support frame 32 can be engaged or fixed to the base 40. In some embodiments, each one of the first and second lateral beams 36, 38 are diametrically-opposed mounted to the base 40 at a respective one of their ends. It will be readily understood that the support frame 32 can either be directly or indirectly fixed to the base 40. For example, in some embodiments, an attachment can be provided to ensure a better engagement between the support frame 32 and the base 40, the attachment mechanically connecting each one of the first and second lateral beams 36, 38 the base 40.

Sample Stage

As illustrated in FIGS. 3 to 9, the ball-mapping system 20 includes a sample stage 42, which will now be described.

The sample stage 42 is positioned below the sample holder 22 and includes, in the illustrated embodiments, a guide assembly comprising a pair of guides, referred to as a first guide 44 and a second guide 46.

The first guide 44 extends along an x-axis, i.e., the first guide 44 has a body extending along a longitudinal direction, which is parallel or coincides with the x-axis, perpendicular to the z-axis.

Similarly, the second guide 46 extends along a y-axis. The y-axis is unparallel to the x-axis and generally perpendicular to the z-axis. In some embodiments, the y-axis can be perpendicular to the x-axis.

The first and second guides 44, 46 can have different geometrical dimensions and configuration, but are depicted, in the illustrated embodiments as having a substantial rectangular cross-section.

It will be readily understood that the first and second guides 44, 46 could be made from almost any material. For example, and without being limitative, the first and second guides 44, 46 can be made of polymers (such as and without being limitative vinyl, fiberglass, rigid polyvinyl chloride (PVC)), metals including metal alloys (such as and without being limitative aluminum and aluminium alloys), stainless steel, brass, copper, combinations thereof, or any other material that can be configured to form a rectangular guide.

The sample stage 42 also includes a sample-contacting surface 48. The sample-contacting surface 48 is engageable with the second guide 46 and is configured to contact the sample when the sample is mounted and hanging from the sample holder 22, as it has been described above. It has to be noted that the sample-receiving cavity 24, the iris diaphragm 26 and/or the combination thereof, which have all been described above, allow the sample to be suspended from the sample-receiving cavity 24, such that the sample or at least a portion thereof is in direct contact with the sample-contacting surface 48. The sample stage 42 can also include a magnetic sliding mechanism including one or more magnets, mounted under the sample-contacting surface 48. In some embodiments, the magnetic sliding mechanism could be movable or guided in translation under the sample-contacting surface 48, for example for assisting the rotational movement of the ball-shaped sample when the sample-contacting surface is in translational movement. In some implementations, the magnetic sliding mechanism can be part of the guide assembly.

The sample-contacting surface 48 is configured to be selectively adjustable along the x-axis and the y-axis. The expression "selectively" herein refers to the fact that the configuration of the first and second guides 44, 46, as well as the sample-contacting surface 48, as it will be described herein below, allows to translate the sample-contacting surface 48 in one direction at a time. For example, the sample-contacting surface 48 could be sequentially translated in a direction parallel to the x-axis, and then in a direction parallel to the y-axis, or vice-versa. In some embodiments, the sample-contacting surface 48 is configured to be simultaneously adjustable along the x-axis and the y-axis. In these embodiments, the displacement along each axis is individually monitored or recorded.

In some embodiments, the sample-contacting surface 48 is made from a rubber mat. The sample-contacting surface 48 could be made from any type of material having a coefficient of static friction allowing the ball-shaped sample to roll thereon, while preventing the ball-shaped sample to slide on the sample-contacting surface 48. Therefore, the coefficient of static friction of the sample-contacting surface 48 is substantially high in comparison to the coefficient of static friction of the sample.

Generally, the sample holder 22 is configured to prevent the ball-shaped sample from sliding on the sample-contacting surface 48 of the sample stage 42, i.e., during its displacement, the sample rolls without sliding onto the sample-contacting surface 48 during its translation. As such, the sample can be characterized at each measurement point once, and it is possible to keep track of the position of each measurement point of the sample with respect to the XRD apparatus during the displacement of the sample. However, in some embodiments, the sample could slide on the sample-contacting surface 48 while rolling thereon. In such embodiments, a tracking unit can be used to track the position of the sample. For example, and without being limitative, the tracking unit can include a marking system, such as physical markings (e.g., dots, lines, shape, indentation or a combination thereof) provided on the sample's surface. The tracking unit can also include a detector for detecting the marking system. A non-limitative example of such a detector is a camera. or similar device, that could be configured to track the position of the marking system during the displacement (i.e., translation, sliding and/or rotation) of the sample.

The second guide 46 is engageable to the first guide 44 and, as illustrated in the embodiment of FIG. 1, the second guide 46 is slidably engaged with the first guide 44. The cooperation, e.g., the mechanical connection, between the first guide 44 and the second guide 46 allows for a relative translational movement between the first guide 44 and the second guide 46, i.e., a position of one of the first guide 44 and the second guide 46 can be changed in translation one with respect to another.

As illustrated, first guide grooves 50A, 50B are provided on two opposite sides (corresponding to a portion of the outer periphery) of the first guide 44. Similarly, second guide grooves 52A, 50B are provided on two opposite sides (corresponding to a portion of the outer periphery) of the second guide 46.

Figure 3:
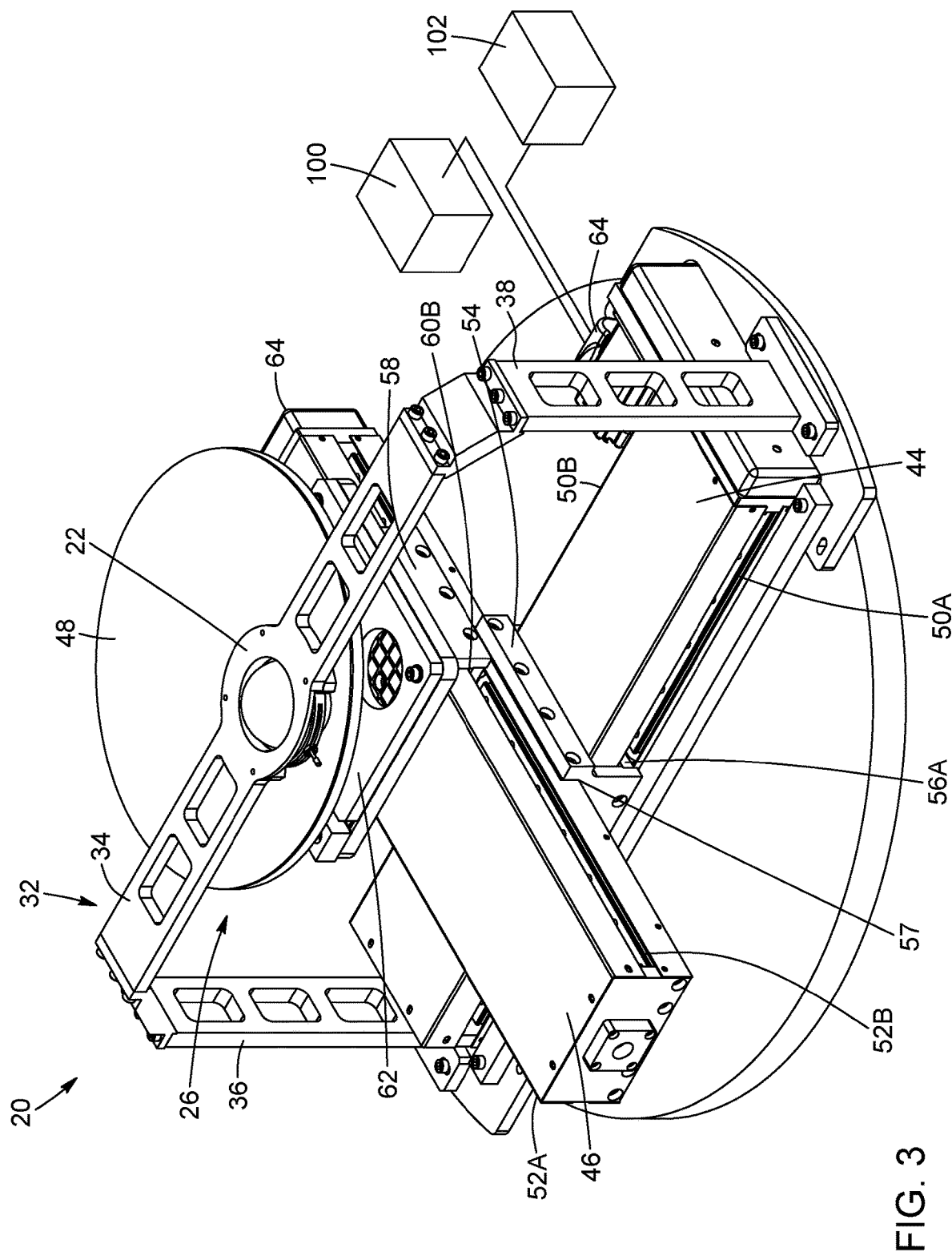
FIG. 3 is a top perspective view of a ball-mapping system, in accordance with another embodiment.
Figure 4:
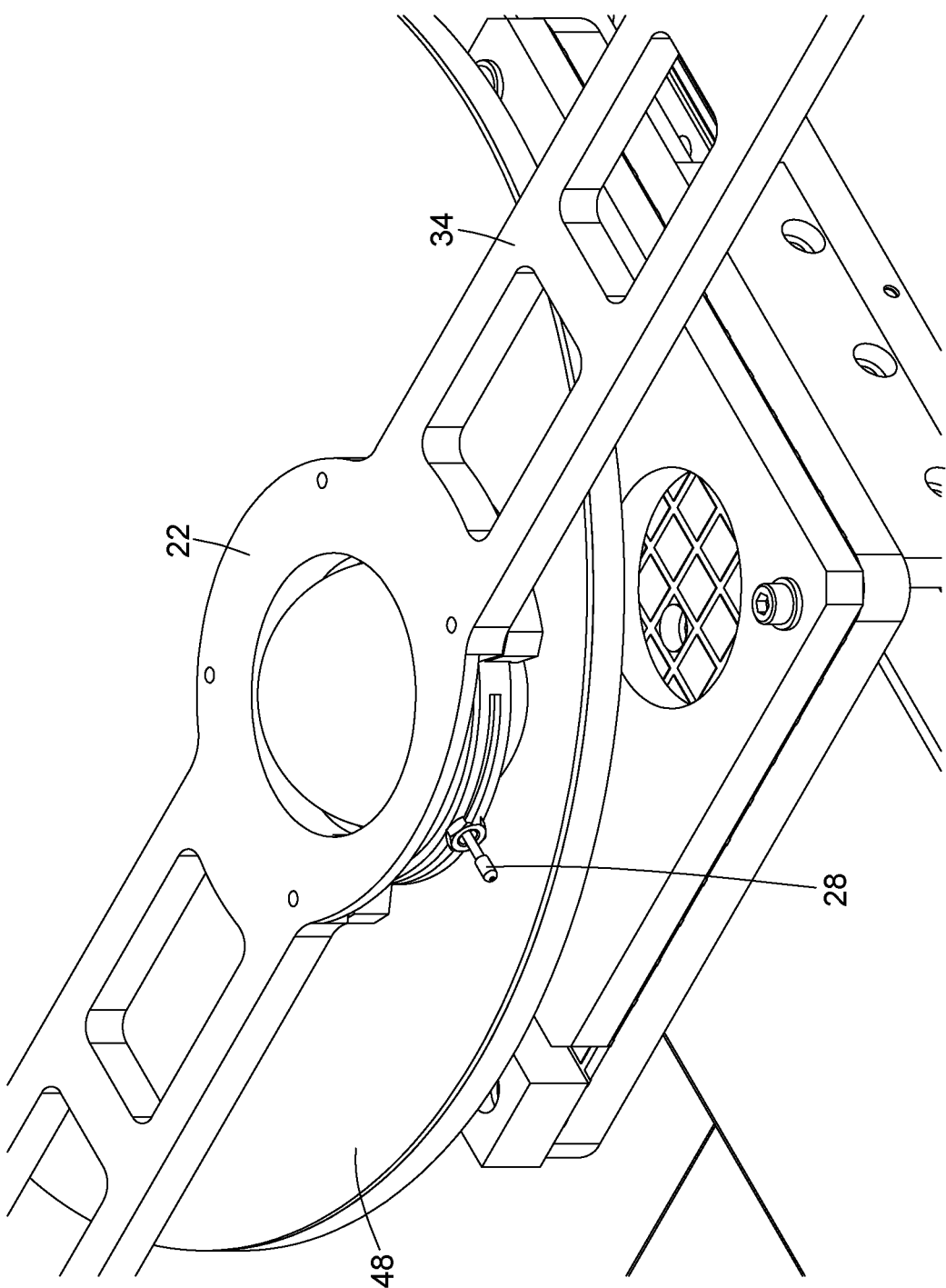
FIG. 4 is a partial top perspective view of the ball-mapping system of FIG. 3.

As better illustrated in FIG. 3, in some embodiments, the sample stage 42 includes a first connector 54. The first connector 54 connects and slidably engages the first guide 44 with the second guide 46.

In some embodiments, the first connector 54 can be made from a broad variety of material. For example, and without being limitative, the first connector 54 may be made from any solid material such made of polymers (such as and without being limitative vinyl, fiberglass, rigid polyvinyl chloride (PVC)), metals including metal alloys (such as and without being limitative aluminum and aluminium alloys), stainless steel, brass, copper, combinations thereof, or any other material that can be configured to form the first connector 54. Of course, the first connector 54 have various geometrical configurations (i.e., size and dimensions). As depicted however, the first connector 54 comprises a U-shaped top portion and an inverted U-shape bottom portion. It will be readily understood that the first connector 54 could have a completely different shape, as long as it provides the appropriate mechanical connection between the first guide 44 and the second guide 46.

In some embodiments, the second guide 46 can be slidably engageable with the first guide 44. In this context, the first guide 44 can be immobile and can be for example affixed to the support frame 32 (or a portion thereof) and/or the base 40, while the second guide 46 is slidably mounted to the first guide.

In the depicted embodiment of FIG. 3, the first connector 54 includes a first pair of rails 56A, 56B. Each one of the first pair of rails 56A, 56B is engageable with a corresponding one of the first guide grooves 50A, 50B, such that the first connector 54 can slide (i.e., move in a relative translational movement) with respect to the first guide 44.

In such embodiments, the first guide 44, and more particularly its guide grooves 50A, 50B can be engaged with corresponding and complementary one of the first connector pair of rails 56A, 56B.

As illustrated, the first connector 54 also includes a first connector channel 57. The first connector channel 57 is sized and configured to receive and hold the second guide 46 therein. In some embodiment, the second guide 46 is fixed to an inner portion of the first connector channel 57. The second guide 46 can be fixed using known mechanical fasteners, such as, but not limited to nails, screws, clips, snap-lock mechanism, combination thereof, or any other element(s) or device(s) allowing to mechanically fix the second guide 46 to the first connector 54.

As such, because the second guide 46 is fixed in the first connector channel 57, when the first connector 54 slides with respect to the first guide 44 during a translation of the sample, then the second guide 56 can be translated along the x-axis (i.e., the direction parallel to the longitudinal axis of the first guide 44).

The sample-contacting surface 48 is engageable to the second guide 46 and, as illustrated in the embodiment of FIG. 1, the sample-contacting surface 48 is slidably engaged with the second guide 46, i.e., in use, there is a relative translational movement between the sample-contacting surface 48 and the second guide 46.

As illustrated, the second guide grooves 52A, 52B are provided on two opposite sides (corresponding to a portion of the outer periphery) of the second guide 46.

In some embodiments, the sample stage 42 includes a second connector 58. For example, and without being limitative, the second connector 58 can connect and slidably engage with the second guide 46.

In some embodiments, the second connector 58 can be made from a broad variety of material and can be similar to the first connector 54. For example, and without being limitative, the second connector 58 may be made from any solid material such made of polymers (such as and without being limitative vinyl, fiberglass, rigid polyvinyl chloride (PVC)), metals including metal alloys (such as and without being limitative aluminum and aluminium alloys), stainless steel, brass, copper, combinations thereof, or any other material that can be configured to form the second connector 58. Of course, the second connector 56 have various geometrical configurations (i.e., size and dimensions). As depicted however, the second connector 56 comprises a U-shaped top portion and an inverted U-shape bottom portion. It will be readily understood that the second connector 56 could have a completely different shape, as long as it provides the appropriate mechanical connection between the second guide 46 and the sample-contacting surface 48.

In some embodiments, the sample-contacting surface 48 can be slidably engageable with the second guide 46.

In the depicted embodiment of FIG. 2, the second connector 58 includes a second pair of rails 60A, 60B. Each one of the first pair of rails 60A, 60B is engageable with a corresponding one of the second guide grooves 52A, 52B, such that the second connector 56 can slide with respect to the second guide 46.

In such embodiments, the second guide 46, and more particularly its guide grooves 52A, 52B rails can be engaged with corresponding and complementary one of the second pair of rails 60A, 60B.

As illustrated, a platform 62 is provided on top of the second connector 58. More particularly, the platform 62 can be fixed or attached to the second connector 58. The platform 62 can be fixed using known mechanical fasteners, such as, but not limited to nails, screws, clips, snap-lock mechanism, combination thereof, or any other element(s) or device(s) allowing to mechanically fix the sample-contacting surface 48 to the second connector 56.

As such, because the platform 62 is fixed to the second connector 58, when the second connector 58 slides with respect to the second guide 46, then the sample-contacting surface 48 can be translated along the y-axis (i.e., the direction parallel to the longitudinal axis of the second guide 46).

Motor Assembly

Figure 5:
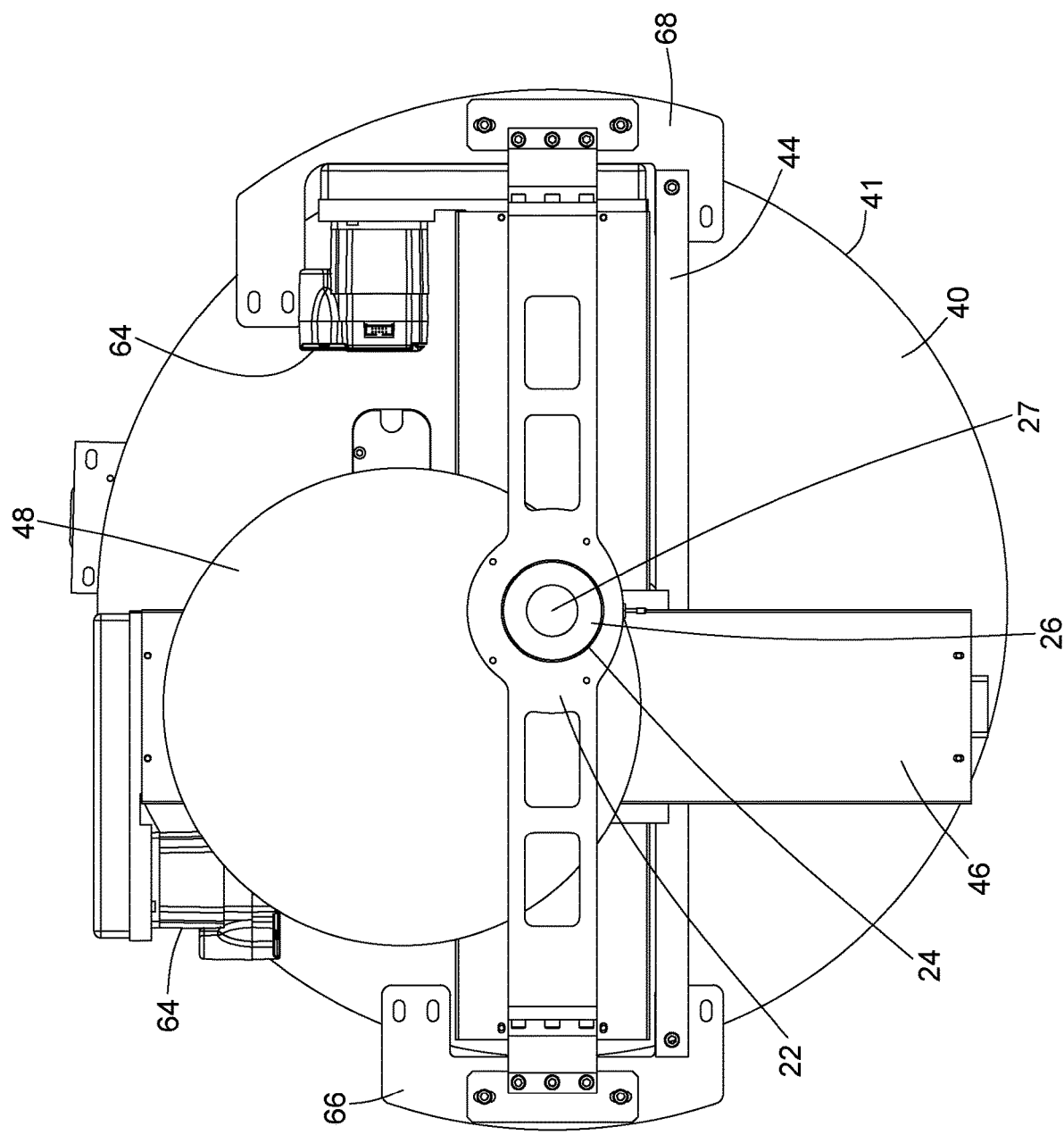
FIG. 5 is a top view of a ball-mapping system, in accordance with one embodiment.
Figure 6:
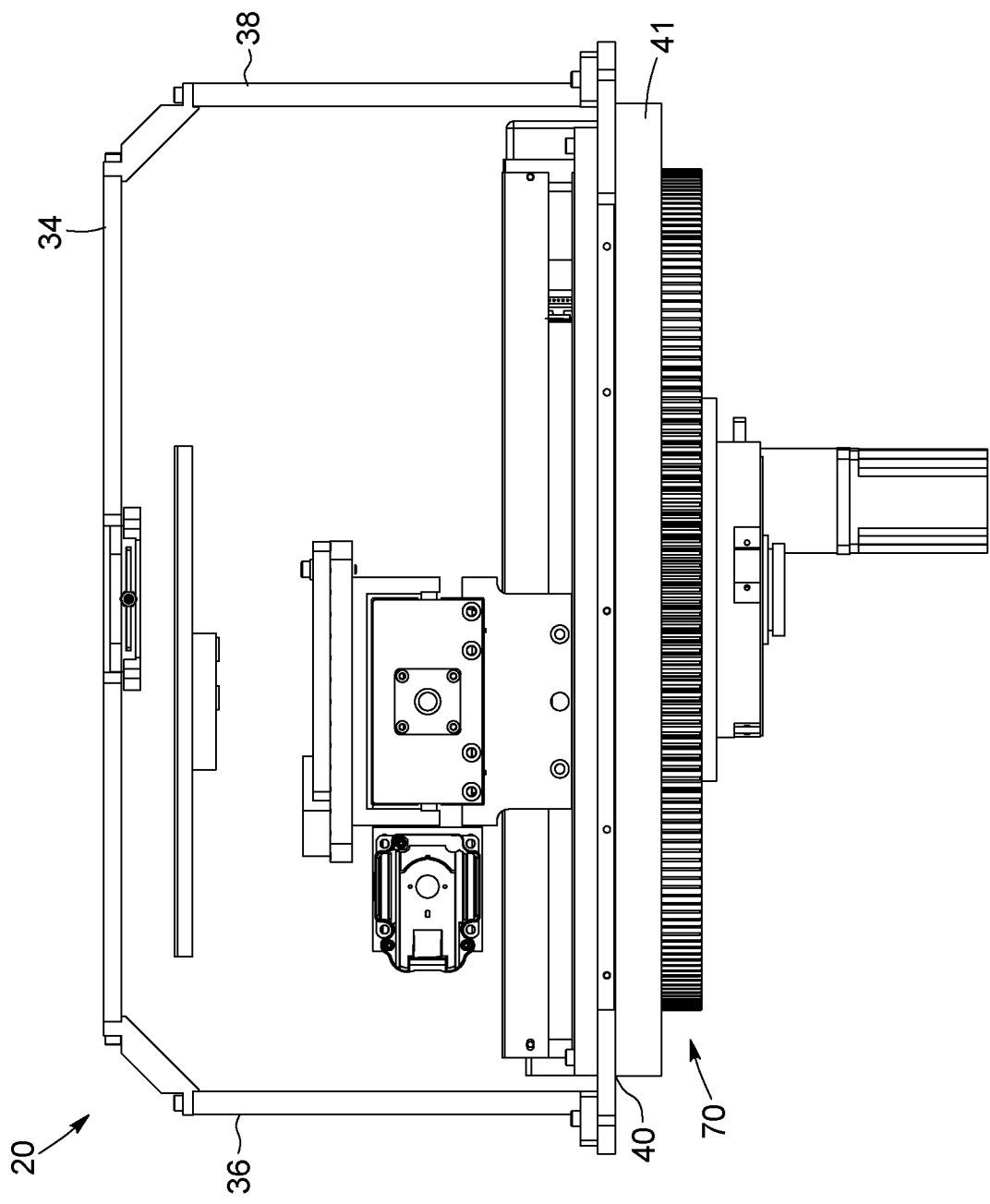
FIG. 6 is a front view of the ball-mapping system of FIG. 5.
Figure 7:
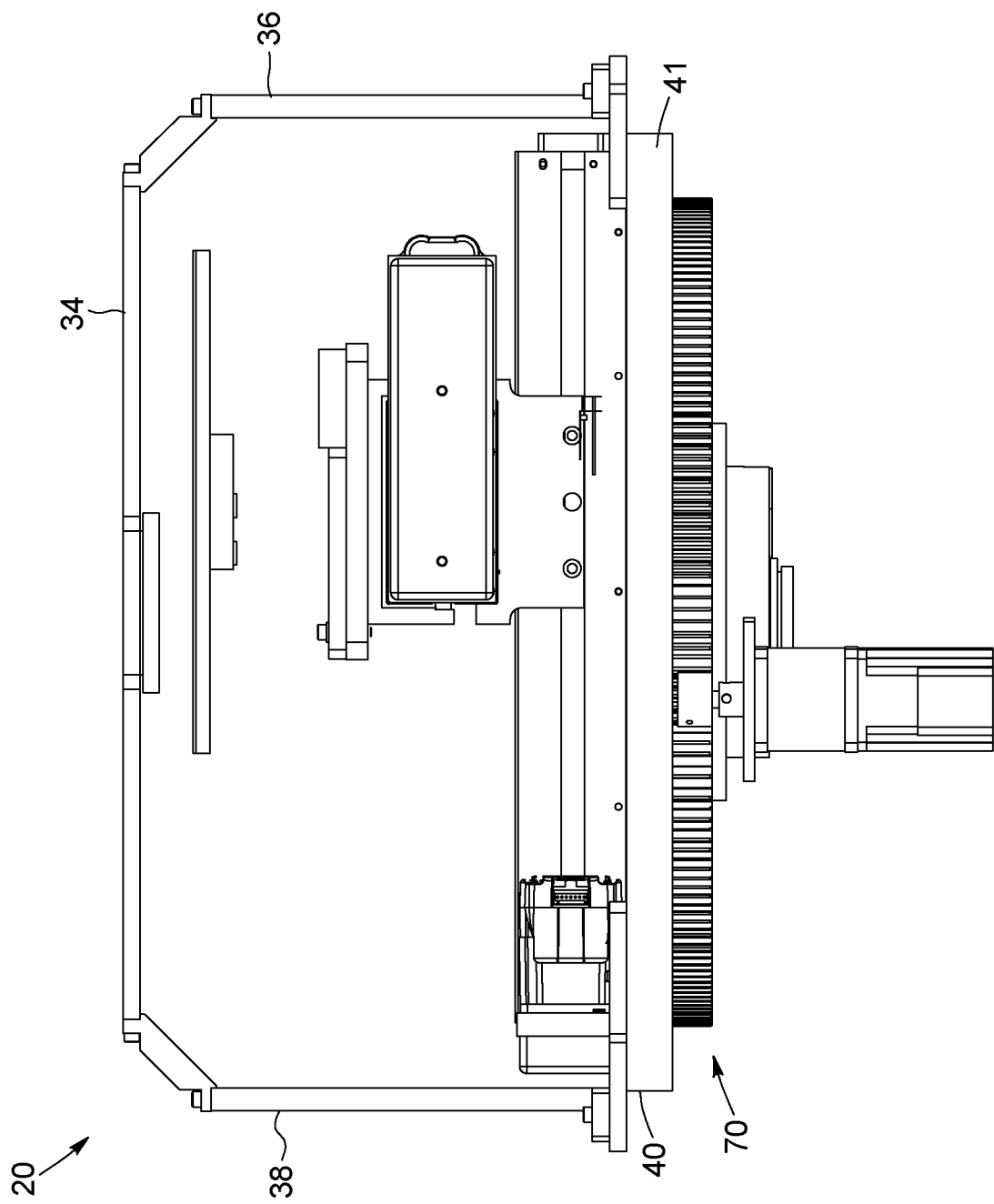
FIG. 7 is a back view of the ball-mapping system of FIG. 5.
Figure 8:
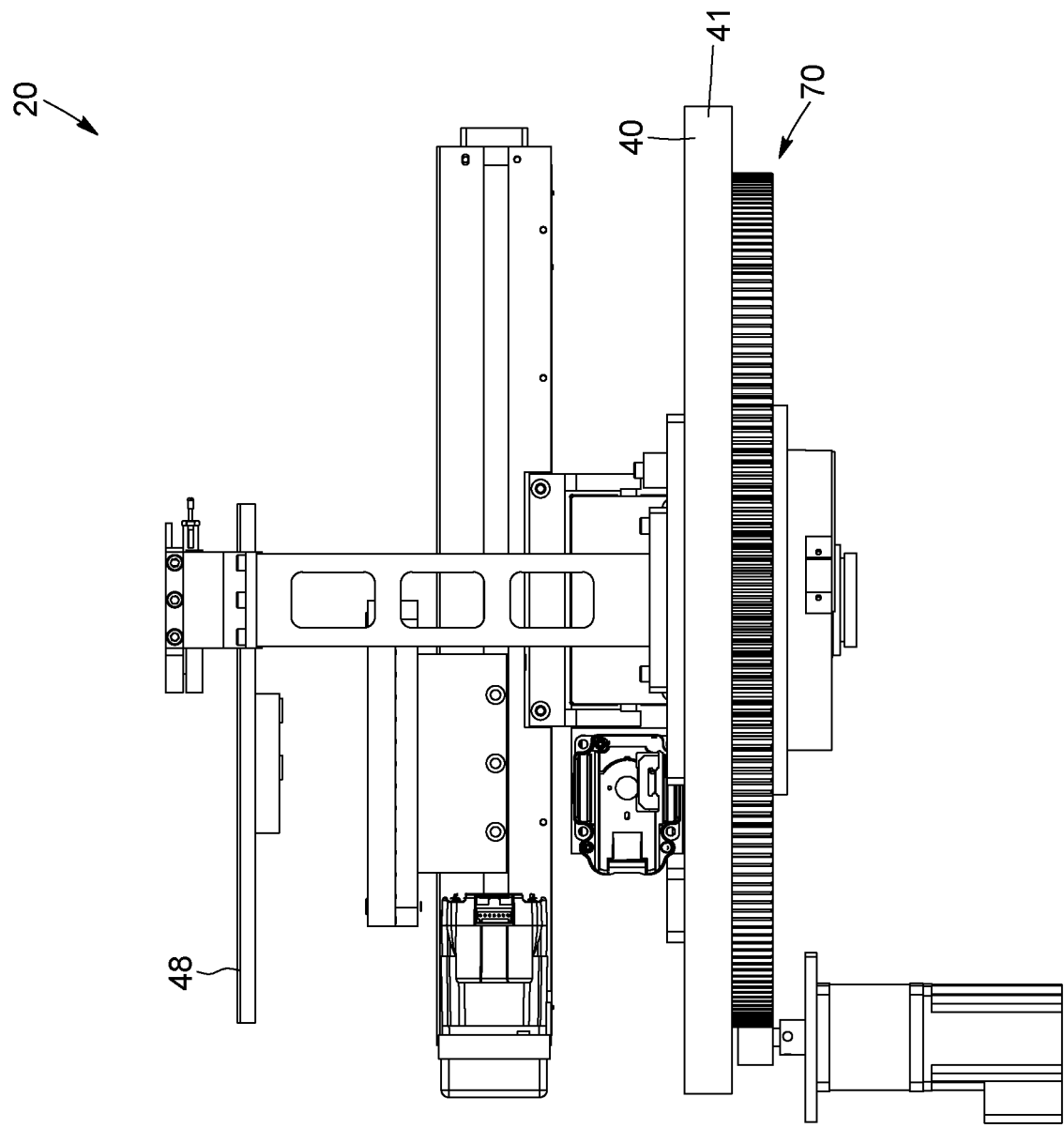
FIG. 8 is a left view of the ball-mapping system of FIG. 5.
Figure 9:
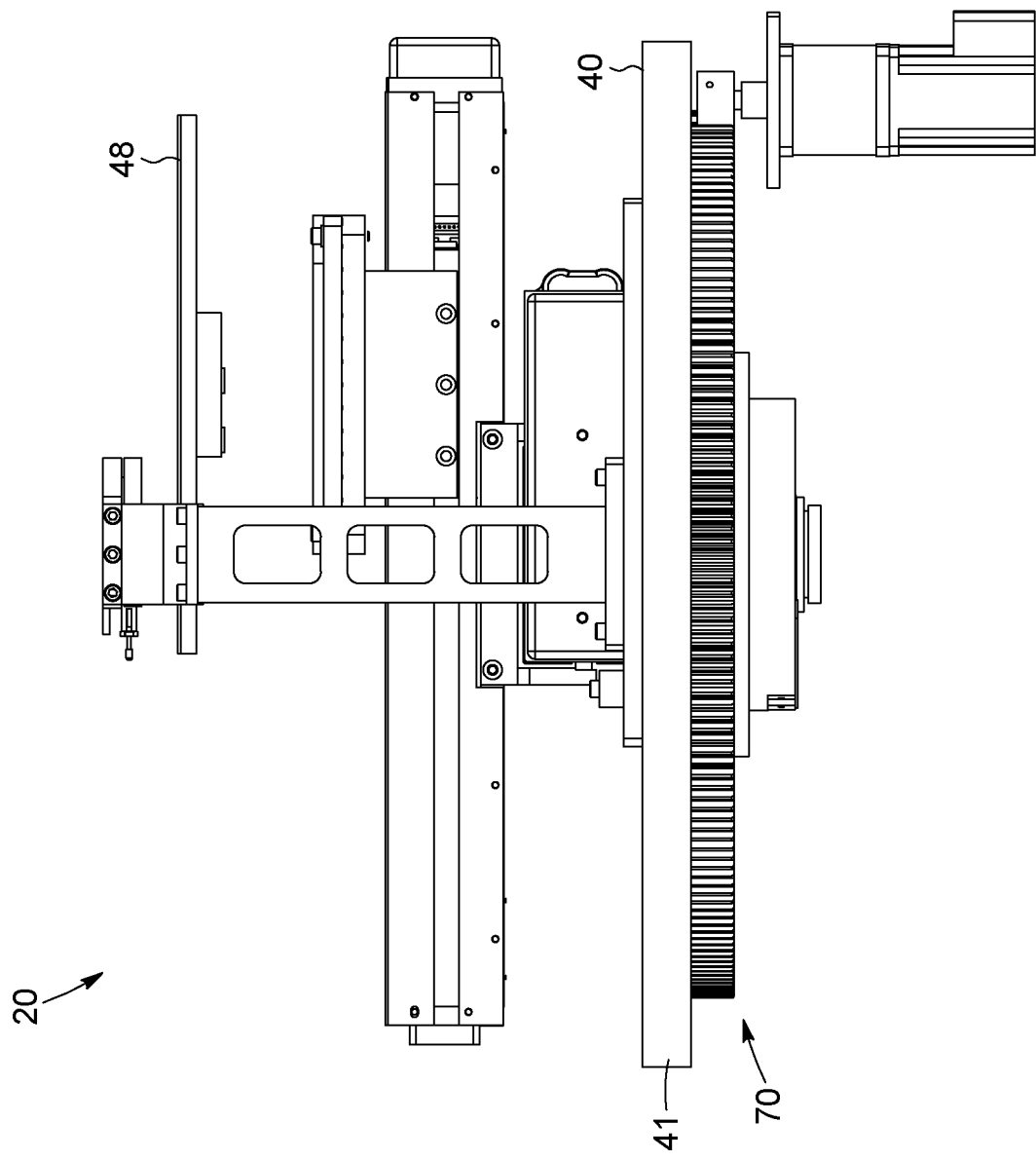
FIG. 9 is a right view of the ball-mapping system of FIG. 5.

As illustrated in FIGS. 3 and 5, the ball-mapping system 20 includes a motor assembly that comprises at least one motor 64. In some embodiments, the ball-mapping system 20 further includes a gearbox 102 mechanically coupled with the at least one motor 64, the gearbox 102 being configured such that the sample-contacting surface 48 is translated along one of the first axis and the second axis at a time.

The motor 64, which can be of any type or design, is configured to operate at least one of the second guide 46 and the sample-contacting surface 48, i.e., to adjust or translate the second guide 46 or the sample-contacting surface 48 along a predetermined direction (e.g., the x-axis or the y-axis).

In some embodiments, the system 20 includes two motors 64, each one of the motors 64 operating a respective one of the second guide 46 and the sample-contacting surface 48. For example, in one embodiment, a first motor could be associated with the second guide 46 and be configured to engage the second guide 46 in a translational movement with respect to the first guide 44 by sliding the first connector 54 along the x-axis. In this embodiment, a second motor could be associated with the sample-contacting surface 48 and be configured to engage the sample-contacting surface 48 in a translational movement with respect to the second guide 46 by sliding the second connector 58 along the y-axis. Of course, the two motors could be interchanged, such that the first motor controls the translational movement along the y-axis, and the second motor controls the translational movement along the x-axis.

Control Unit

In some embodiments, the ball-mapping system 20 includes a control unit 100 for controlling the motor assembly (e.g., the motor 64) and directing movement of the sample stage 42, such that X-ray diffraction data is collected at each one of the measurement points. For example, and without being limitative, the control unit 100 can be embodied by a programmable computer, comprising at least one processor, a data storage system (including volatile and non-volatile memory and/or storage elements), at least one input device, and at least one output device. The programmable computer can, in some embodiments, executes computer programs that allows controlling the motor assembly and directing the movement of the sample stage 42.

In other embodiments, the ball-mapping system 20 is connectable to an X-ray diffraction apparatus that generates X-ray radiation and to a control unit controlling the motor assembly and directing movement of the sample stage such that X-ray diffraction data is collected at each one of the measurement points.

Rotation Implementations

In some embodiments, the ball-mapping system 20 can be configured such that the support frame 32 can rotate about the sample holder 22. The rotation of the support frame 32 can be useful when it is necessary to orient the sample under investigation with the XRD apparatus. For example, and without being limitative, the rotation of the support frame 32, and thus the sample, can allow to orient or align the crystal structure (or a portion thereof) of the sample with the XRD source and/or detector(s). The rotation can be provided, for example and without being limitative, by the supporting element 70.

In these embodiments, the system 20 includes a first mounting bracket 66 and second mounting bracket 68, each being slidably mounted to the base 40, such that they can slide following the outer periphery 41 of the base 40.

In some embodiments, the first and second mounting brackets 66, 68 engage the support frame 32 in rotation with the base 40.

In some embodiments, the first and second mounting brackets 66, 68 are diametrically opposed and are each provided at a respective extremity of the first guide 44. Of course, in alternate embodiments, the system could include other bracket(s) or similar components.

In these implementations, the sample-contacting surface 48 can then be translated along the x-axis and the y-axis and the support frame 32 can be rotated by an angle φ. As it has been previously presented, only one degree of freedom is generally adjustable at a time. For example, when the sample-contacting surface 48 is translated along the x-axis, it is not translated along y-axis and the support frame 32 is not rotated by an angle φ. Similarly, when the sample-contacting surface 48 is translated along the y-axis, it is not translated along x-axis and the support frame 32 is not rotated by an angle φ. Moreover, when the support frame 32 is rotated by an angle φ, the sample-contacting surface 48 is not translated along the x-axis and it is not translated along y-axis.

In the rotation implementations, the system 20 also includes at least one motor(s) configured to operate at least one of the second guide 46 and the sample-contacting surface 48, i.e., to adjust or translate the second guide 46 or the sample-contacting surface 48 along a predetermined direction (e.g., x-axis or y-axis), but also to rotate the support frame 32 by an angle φ. It is to be noted that the center of rotation is near or at the center of the sample holder 22.

In some embodiments, the motor assembly described above includes three motors, two of them being for operating a respective one of the second guide 46 and the sample-contacting surface 48, and the other one to rotate support frame 32. For example, in one embodiment, a first motor could be associated with the second guide 46 and be configured to engage the second guide 46 in a translational movement with respect to the first guide 44 by sliding the first connector 54 along the x-axis. In this embodiment, a second motor could be associated with the sample-contacting surface 48 and be configured to engage the sample-contacting surface 48 in a translational movement with respect to the second guide 46 by sliding the second connector 56 along the y-axis. The third motor could be associated with the support frame 32, the first mounting bracket 66 and/or the second mounting bracket 68 and be configured to engage the support frame 32 (or portion thereof), the first mounting bracket 66 and/or the second mounting bracket 68 in a rotational movement about the center of the sample holder 22. Of course, the three motors could be interchanged, such that any one of the three motors could control the translational movement along the y-axis, another one of the three motors could control the translational movement along the x-axis and yet another one of the three motors could control the rotational movement.

As described above, the ball-mapping system 20 can be useful for maintaining a sample at a plurality of subsequent precise or predetermined locations during its characterization. Moreover, the adjustable size of the iris diaphragm 26 allows to apply an appropriate pressure onto the sample, such that the sample can roll on the sample-contacting surface 48, having a sufficient coefficient of static friction, from one characterization position to another. The motor(s) 64 can advantageously position the sample-contacting surface 48 and keeps track of the absolute positioning, which requires ordered relative displacement of the first and second guides 44, 46. The ball-mapping system 20 can also be configured to provide different data from the same location on the sample. As a result of the combined abovementioned features, the ball-mapping system 20 can provide a substantially complete view of the surface conditions of the sample, thus revealing the poles or irregularities of the surface (e.g., consistency, high points and/or low points). It is to be noted that the ball-mapping system 20 is configured such that the characterization of the sample could be at least partially automated. Of course, one would readily understand that the ball-mapping system 20 can be used for mapping data of a sample before or after the sample has been used or cycled, for example for quality control.

Although the embodiments of the sample holder, the sample stage and the motor, as well as their corresponding parts thereof consist of certain geometrical configurations and dimensions as explained and illustrated herein, not all of these components, geometries and dimensions are essential and thus should not be taken in their restrictive sense. It is to be understood, as also apparent to a person skilled in the art, that other suitable components and cooperation thereinbetween, as well as other suitable geometrical configurations, dimensions, shape, and the like may be used for the sample holder, the sample stage and the motor.

Method for Mapping a Ball-Shaped Sample

In accordance with embodiments, there is also provided a method for mapping a ball-shaped sample.

Broadly described, the method includes steps of mounting the ball-shaped sample in a sample holder; contacting a portion of the ball-shaped sample with a sample-contacting surface of a sample stage; adjusting the sample stage along two mutually perpendicular axes such that the sample is in a characterization position; characterizing the ball-shaped sample with the X-ray diffraction apparatus; and moving the ball-shaped sample to another characterization position.

In one implementation, there is provided a method for mapping of a ball-shaped sample using X-ray diffraction.

The method includes placing the ball-shaped sample on a sample-contacting surface; restricting movement of the ball-shaped sample with respect to the sample-contacting surface; translating the sample-contacting surface along a first axis and a second axis unparallel to the first axis, thereby causing the ball-shaped sample to rotate on the sample-contacting surface along of the first axis and the second axis to align a plurality of measurement points with an X-ray beam originating from an X-ray diffraction apparatus; and operating the X-ray diffraction apparatus to collect X-ray diffraction data at each one of the measurement points.

In some embodiments, translating the sample-contacting surface includes independently translating the sample-contacting surface along the first axis and the second axis unparallel to the first axis to sequentially align said plurality of measurement points with the X-ray beam originating from the X-ray diffraction apparatus.

In some embodiments, translating the sample-contacting surfaces includes simultaneously translating the sample-contacting surface along the first axis and the second axis unparallel to the first axis to align said plurality of measurement points with the X-ray beam originating from the X-ray diffraction apparatus.

In some embodiments, translating the sample-contacting surface includes operating a motor assembly in driving engagement with a guide assembly cooperating with the sample-contacting surface for driving the sample-contacting surface in translational movement along the first axis and the second axis.

In some embodiments, the first axis and second axis are orthogonal.

In some embodiments, the method, further includes rotating the sample holder by a predetermined angle to adjust a rotational degree-of-freedom of the sample holder.

In some embodiments, translating the sample-contacting surface includes preventing the ball-shaped sample from sliding when the sample-contacting surface is in movement with respect to the ball-shaped sample.

In some embodiments, operating the X-ray diffraction apparatus includes collecting between about 5 to about 300 measurement points.

Figure 10:
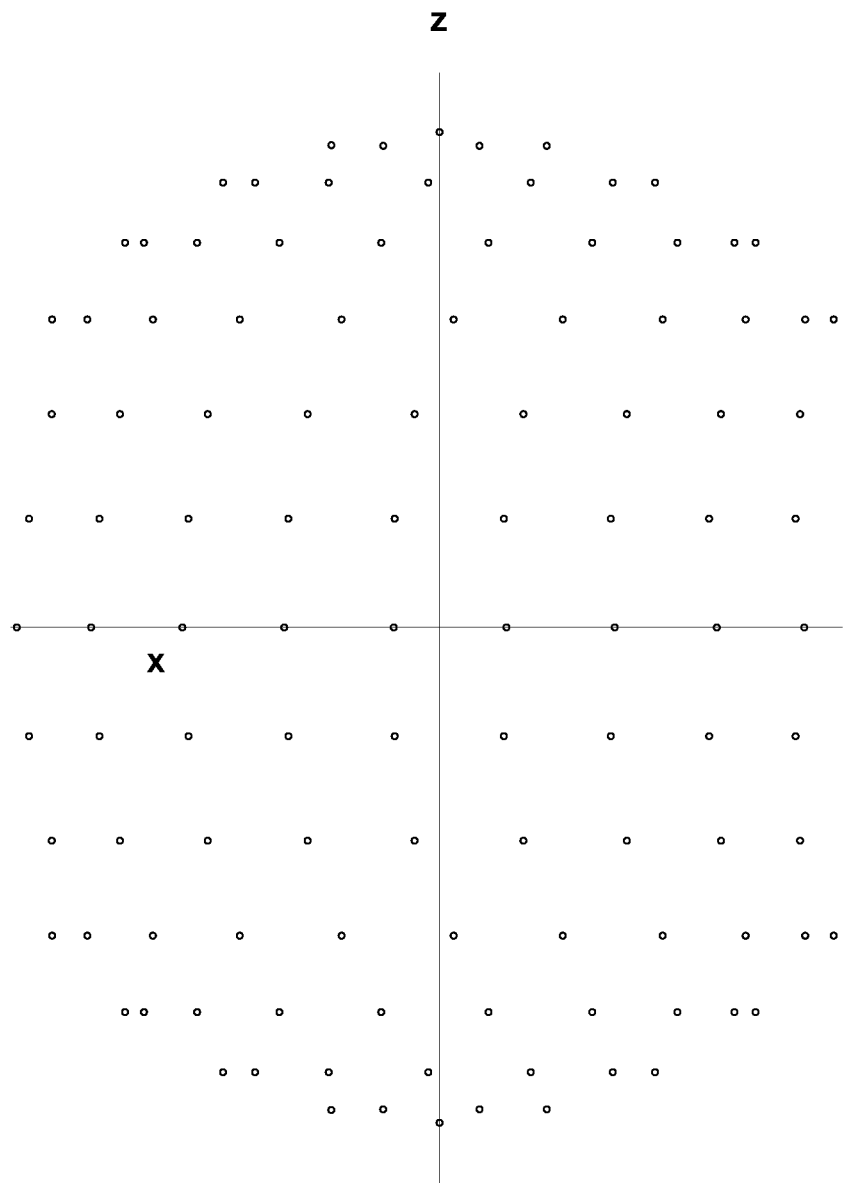
FIG. 10 is a representation of a distribution of measurement points, in accordance with one embodiment of a model.
Figure 11A:
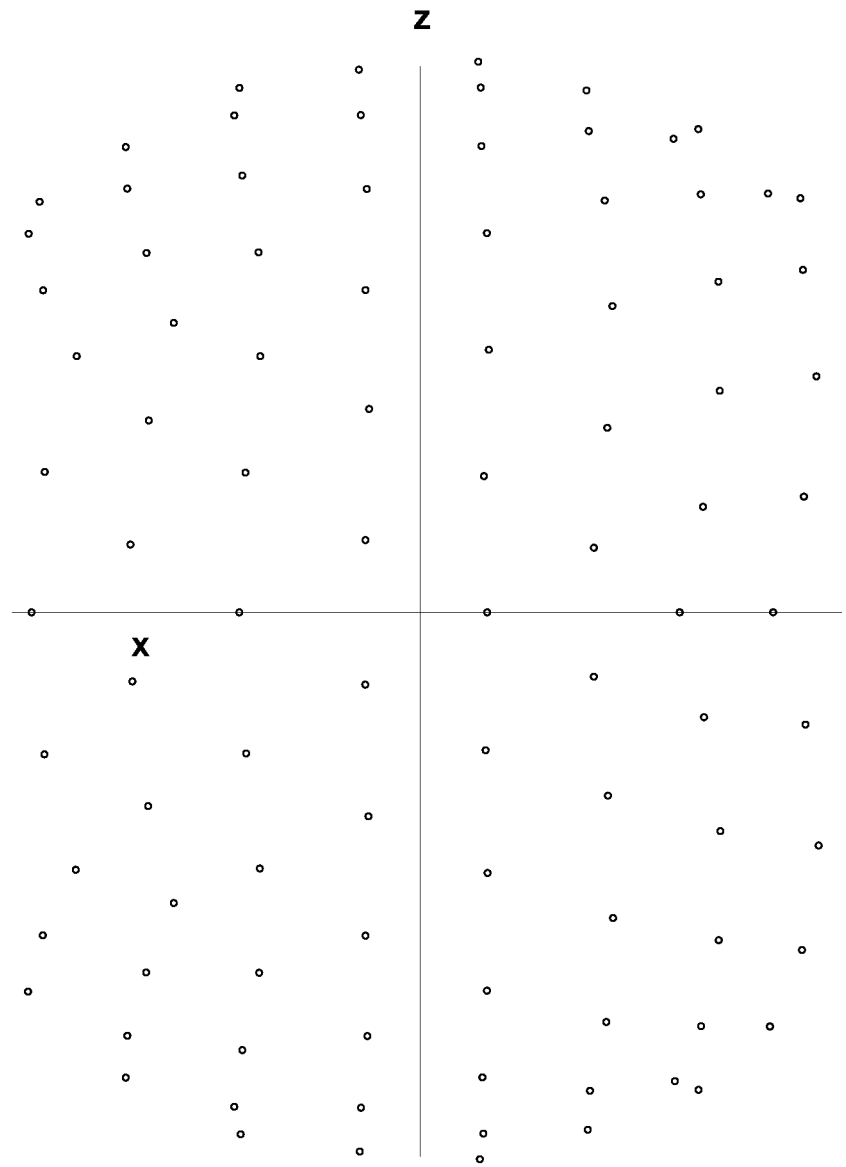
FIG. 11A-B are a representation of a distribution of measurement points, in accordance with another embodiment of a model.
Figure 11B:
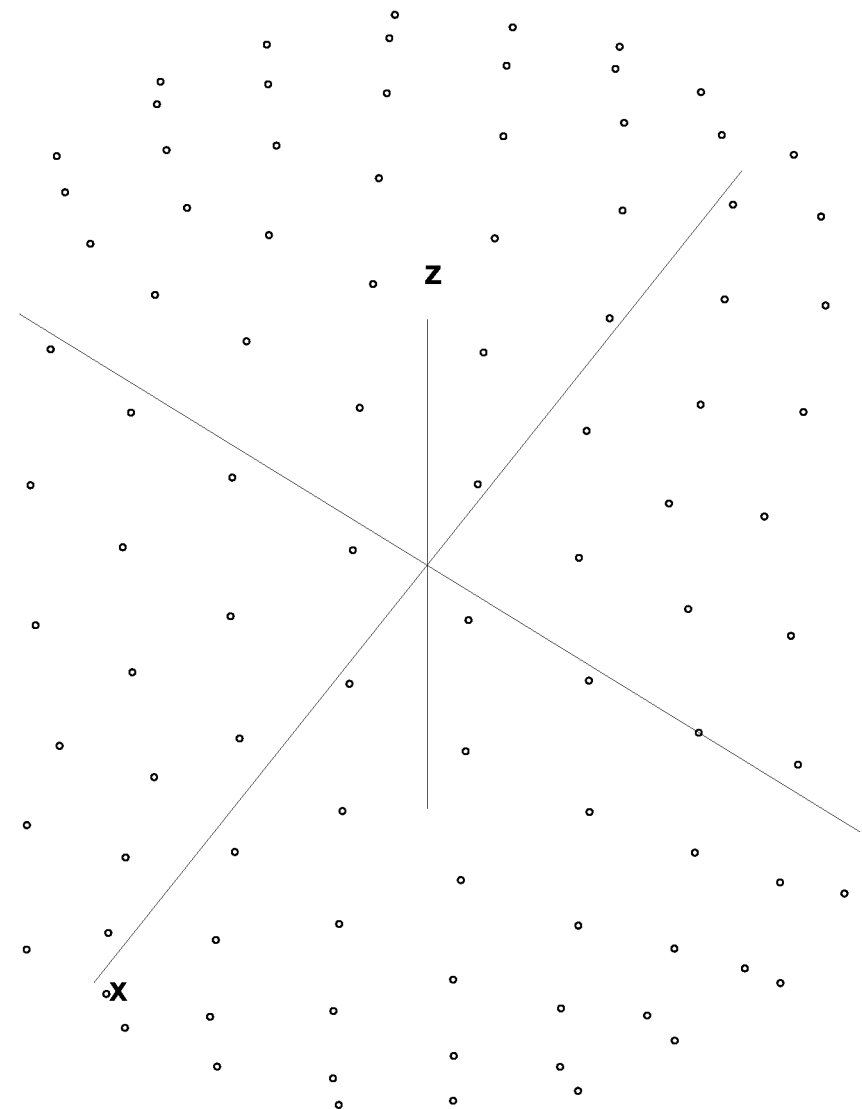

In some embodiments, the method includes generating a model representative of a surface of the ball-shaped sample and distributing virtual measurement points on the model, the virtual measurement points being representative of the measurement points. In some embodiments, the model is a polygon having a center coinciding with a center of the ball-shaped sample. In some embodiments, wherein the model is an icosahedron. Examples of models are illustrated in FIGS. 10 and 11A-B, wherein the dots are representative of the positions of the measurement points at which X-ray diffraction data will be collected and analyzed.

In another implementation, there is provided a method for mapping a ball-shaped sample with an X-ray diffraction apparatus. The method includes steps of: mounting the ball-shaped sample in a sample holder; contacting a portion of the ball-shaped sample with a sample-contacting surface of a sample stage; adjusting the sample stage along two mutually perpendicular axes, including selectively engaging the sample stage in a sequential translation movement along the two mutually perpendicular axes and engaging the sample to roll on the sample-contacting surface along a respective one of the two mutually perpendicular axes at a time towards a characterization position; characterizing the ball-shaped sample with the X-ray diffraction apparatus while the sample is in the characterization position; and moving the ball-shaped sample to another characterization position.

In some embodiments, the step of adjusting the sample stage along two mutually perpendicular axes includes adjusting the sample stage along an x-axis and independently adjusting the sample stage along a y-axis.

In some embodiments, the sample holder has a rotational degree-of-freedom. The method can further include a step of adjusting the rotational degree-of-freedom of the sample holder with respect to the sample stage.

In some embodiments, adjusting the rotational degree-of-freedom includes rotating the sample holder by a predetermined angle.

In some embodiments, the method includes a step of engaging the sample to roll on the sample-contacting surface along a corresponding one of the two mutually perpendicular axes.

In some embodiments, the step of characterizing the ball-shaped sample includes predetermining locations of measurements on the ball-shaped sample by distributing measurement points on the ball-shaped sample.

In some embodiments, distributing the measurement points on the ball-shaped sample includes positioning said plurality of measurement points at predetermined latitudes of the ball-shaped sample, each one of the predetermined latitudes comprising a preselected number of measurement points. Such a distribution of measurement points is illustrated in FIG. 10.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction and in a y-axis direction; and independently changing a position of the sample stage along the x-axis direction and along the y-axis direction.

In some embodiments, the preselected latitudes each comprises the same number of preselected number of measurement points.

In some embodiments, the number of measurement points ranges from about 6 to about 300.

In some embodiments, distributing the measurement points on the ball-shaped sample includes generating a polygonal model having a center coinciding with a center of the sample; positioning said plurality of measurement points on the vertices of the polygonal model. Such a distribution of measurement points is illustrated in FIGS. 11A-B.

In some embodiments, the polygonal model is an icosahedron.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction and in a y-axis direction; independently changing a position of the sample stage along the x-axis direction and along the y-axis direction.

In some embodiments, the number of measurement points ranges from about 10 to about 370.

In another implementation, there is provided a method for mapping a ball-shaped sample with an X-ray diffraction apparatus. The method includes of mounting the ball-shaped sample in a sample holder; contacting a portion of the ball-shaped sample with a sample-contacting surface of a sample stage; adjusting the sample stage along two translational degrees-of-freedom, including selectively engaging the sample stage in a sequential translation movement along the two translational degrees-of freedom towards a characterization position, such that:
when translating the sample stage along a first one of the two translational degrees-of-freedom:
locking a second one of the two translational degrees-of-freedom; and
when translating the sample stage along the second one of the two translational degrees-of-freedom;
locking the first one of the two translational degrees-of-freedom.

The method also includes steps of characterizing the ball-shaped sample with the X-ray diffraction apparatus while the sample is in the characterization position; and moving the ball-shaped sample to another characterization position.

In some embodiments, the first degree of freedom and the second degree of freedom are mutually perpendicular.

In some embodiments, the step of adjusting the sample stage along two translational degrees-of-freedom includes adjusting the first one of the two translational degrees-of-freedom; and subsequently adjusting the second one of the two translational degrees-of-freedom.

In some embodiments, the sample holder has a rotational degree-of-freedom, and the method further includes a step of adjusting the rotational degree-of-freedom of the sample holder with respect to the sample stage.

In some embodiments, adjusting the rotational degree-of-freedom includes rotating the sample holder by a predetermined angle.

In some embodiments, the method further includes engaging the sample to roll on the sample-contacting surface along a corresponding one of the two translational degrees-of-freedom.

In some embodiments, the step of characterizing the ball-shaped sample includes predetermining locations of measurements on the ball-shaped sample by distributing measurement points on the ball-shaped sample.

In some embodiments, distributing the measurement points on the ball-shaped sample includes positioning said plurality of measurement points at predetermined latitudes of the ball-shaped sample, each one of the predetermined latitudes comprising a preselected number of measurement points.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction extending parallel to the first one of the two translational degrees-of-freedom and in a y-axis direction extending parallel to the first one of the two translational degrees-of-freedom; and independently changing a position of the sample stage along the x-axis direction and along the y-axis direction.

In some embodiments, the preselected latitudes each includes the same number of preselected number of measurement points.

In some embodiments, the number of measurement points ranges from about 6 to about 300.

In some embodiments, distributing the measurement points on the ball-shaped sample includes generating a polygonal model having a center coinciding with a center of the sample; and positioning said plurality of measurement points on the vertices of the polygonal model.

In some embodiments, the polygonal model is an icosahedron.

In some embodiments, the step of moving the ball-shaped sample to another characterization position includes calculating the polar coordinates of a first measurement point and of a second measurement point, the second measurement point being associated with said another characterization position; associating a curve trajectory between the first measurement point and the second measurement point, the curve trajectory defining an arc extending from the first measurement point to the second measurement point; converting the curve trajectory into a planar trajectory; decomposing the planar trajectory in an x-axis direction extending parallel to the first one of the two translational degrees-of-freedom and in a y-axis direction extending parallel to the second one of the two translational degrees-of-freedom; and independently changing a position of the sample stage along the x-axis direction and along the y-axis direction.

In some embodiments, the number of measurement points ranges from about 10 to about 370.

In some embodiments, the method relies on different data collection schemes. In one example, the method relies on a pseudo geodesic/solid angle position calculator based on a user input (e.g., the predetermined number of measurement points), for example in view of obtaining even spacing between neighboring measurement points.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. A ball-mapping system connectable to an X-ray diffraction apparatus, for collecting X-ray diffraction data at measurement points located on a ball-shaped sample, the ball-mapping system comprising:
a sample stage, comprising:
a sample-contacting surface onto which the ball-shaped sample is placeable; and
a guide assembly cooperating with the sample-contacting surface for guiding the sample-contacting surface along a first axis and along a second axis unparallel to the first axis;

a sample holder for keeping the ball-shaped sample in contact with the sample stage;

a motor assembly in a driving engagement with the guide assembly, the motor assembly driving the sample-contacting surface in a translational movement along the first axis and the second axis, the translational movement of the sample-contacting surface causing the ball-shaped sample to rotate on the sample-contacting surface along the first axis and the second axis; and a control unit for controlling the motor assembly and directing a movement of the sample stage such that X-ray diffraction data is collected at each one of the measurement points located on the ball-shaped sample.

2. The ball-mapping system of claim 1, wherein the guide assembly comprises:

a first guide cooperating with the sample-contacting surface for guiding the sample-contacting surface along the first axis; and a second guide cooperating with the sample-contacting surface for guiding the sample-contacting surface along the second axis.

3. The ball-mapping system of claim 2, wherein the first guide is slidably engaged with the sample stage.

4. The ball-mapping system of claim 3, wherein the second guide is slidably engaged with the first guide.

5. The ball-mapping system of claim 2, wherein the first guide has an elongated shape extending along the first axis, and the second guide has an elongated shape extending along the second axis.

6. The ball-mapping system of claim 2, further comprising:

first guide grooves provided in two opposite sides of the first guide;

a first connector for slidably engaging the second guide with the first guide, the first connector comprising:
  a first pair of rails mechanically cooperating with the first guide grooves; and
  a first connector channel sized and configured to hold the second guide therein;

second guide grooves provided in two opposite sides of the second guide; and a second connector to slidably engage the sample-contacting surface with the second guide, the second connector comprising:
  a second pair of rails mechanically cooperating with the second guide grooves; and
  a platform mounted on top of the second connector.

7. The ball-mapping system of claim 2, wherein the motor assembly is in an independent driving engagement with the first guide and the second guide.

8. The ball-mapping system of claim 1, wherein the sample holder comprises a sample-receiving cavity sized to receive the ball-shaped sample therein.

9. The ball-mapping system of claim 8, further comprising an iris diaphragm having a central aperture, the iris diaphragm being provided within the sample-receiving cavity and being adjustable to contract and expand within the sample-receiving cavity to hold the ball-shaped sample.

10. The ball-mapping system of claim 9, further comprising:

a ring extending along and mechanically coupled to an outer periphery of the iris diaphragm; and a lever mechanically coupled to the ring, wherein, upon a rotation of the lever, the ring rotates and engages the iris diaphragm to contract or expand, thereby adjusting the central aperture of the iris diaphragm.

11. The ball-mapping system of claim 9, wherein the iris diaphragm comprises a plurality of interlocked metal blades.

12. The ball-mapping system of claim 1, wherein the sample-contacting surface is made of a material having a first coefficient of friction, and the ball-shaped sample is made of a material having a second coefficient of friction, the first coefficient of friction being greater that the second coefficient of friction, thereby allowing the ball-shaped sample to roll rather than slide on the sample-contacting surface.

13. The ball-mapping system of claim 1, wherein the sample-contacting surface comprises a rubber mat.

14. The ball-mapping system of claim 1, wherein the sample-contacting surface has a substantially circular cross-section, the substantially circular cross-section extending in a plane parallel to the first axis and to the second axis.

15. The ball-mapping system of claim 1, wherein the motor assembly is configured to simultaneously drive the sample-contacting surface in a translational movement along the first axis and the second axis.

16. The ball-mapping system of claim 1, wherein the motor assembly comprises at least one motor configured to independently drive the sample-contacting surface in a translational movement along the first axis and the second axis.

17. The ball-mapping system of claim 16, further comprising a gearbox mechanically coupled with the at least one motor, the gearbox being configured such that the sample-contacting surface is translated along one of the first axis and the second axis at a time.

18. The ball-mapping system of claim 1, wherein the motor assembly comprises at least two independent motors, each one of the at least two independent motors driving the sample-contacting surface along a corresponding one of the first axis and the second axis.

19. The ball-mapping system of claim 1, wherein the first axis and the second axis are orthogonal to each other.

20. The ball-mapping system of claim 1, wherein the sample holder is configured to prevent the ball-shaped sample from sliding on the sample-contacting surface.

21. The ball-mapping system of claim 1, wherein the motor assembly is configured to sequentially drive the sample-contacting surface in a translational movement along the first axis and the second axis.

* * * * *